(12) United States Patent
Babbar

(10) Patent No.: US 9,948,079 B2
(45) Date of Patent: Apr. 17, 2018

(54) QUICK-CONNECT ELECTRICAL JUNCTION BOXES AND METHODS

(71) Applicant: Power Access Solutions, Inc., Fremont, CA (US)

(72) Inventor: Khem C. Babbar, Fremont, CA (US)

(73) Assignee: Power Access Solution, Inc., Fremont, CA (US)

(*) Notice: Subject to any disclaimer, the term of this patent is extended or adjusted under 35 U.S.C. 154(b) by 0 days.

(21) Appl. No.: 15/474,951

(22) Filed: Mar. 30, 2017

(65) Prior Publication Data

US 2017/0288381 A1   Oct. 5, 2017

Related U.S. Application Data

(60) Provisional application No. 62/317,970, filed on Apr. 4, 2016.

(51) Int. Cl.
*H02G 5/08* (2006.01)
*H02G 3/08* (2006.01)
*H02G 3/16* (2006.01)

(52) U.S. Cl.
CPC ............. *H02G 5/08* (2013.01); *H02G 3/081* (2013.01); *H02G 3/16* (2013.01)

(58) Field of Classification Search
CPC ............. H02G 5/08; H02G 3/081; H02G 3/16
USPC .......................................................... 174/53
See application file for complete search history.

(56) References Cited

U.S. PATENT DOCUMENTS 4,897,048 A * 1/1990 Liebon ............... H02G 5/06
                                                   439/211
6,657,852 B2 * 12/2003 Reker ................ H05K 7/1465
                                                   174/64

* cited by examiner

*Primary Examiner* — Dhirubhai R Patel
(74) *Attorney, Agent, or Firm* — Rutan & Tucker, LLP

(57) ABSTRACT

Provided herein in some embodiments is an quick-connect electrical junction box including a front cover, a bus module, and a back cover configured to fit together and form the quick-connect electrical junction box. The front cover can include a front face including a number of sockets configured to accept a number of prongs of one or more electrical accessory modules. The front cover can also include a back face including a number of clamp tunnels corresponding to the number of sockets. The bus module can include a front face including a bus assembly fixed to the bus-module front face, wherein the bus assembly can include a number of clamps correspondingly disposed in the number clamp tunnels. The bus module can also include a back face including a number of bus assembly-connected wire lugs fixed thereto for wiring the quick-connect electrical junction box to a circuit breaker or another quick-connect electrical junction box.

11 Claims, 15 Drawing Sheets

Figure 1:
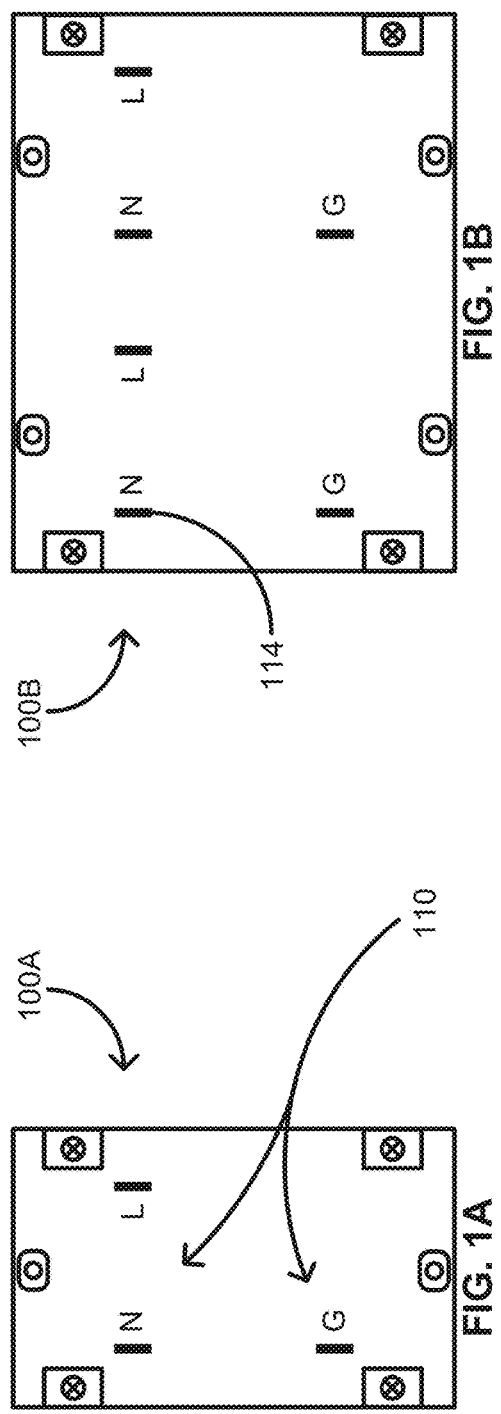

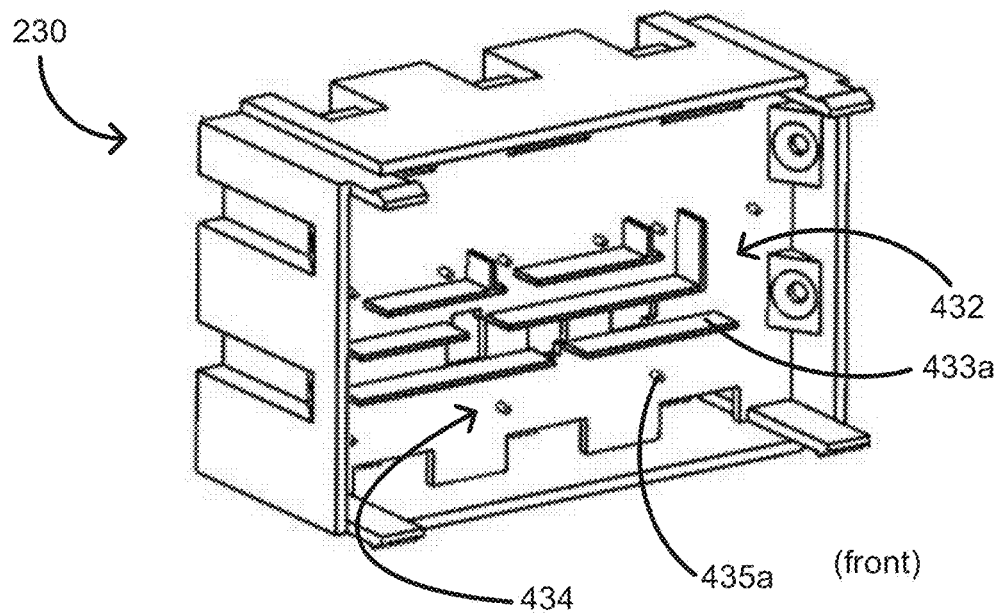
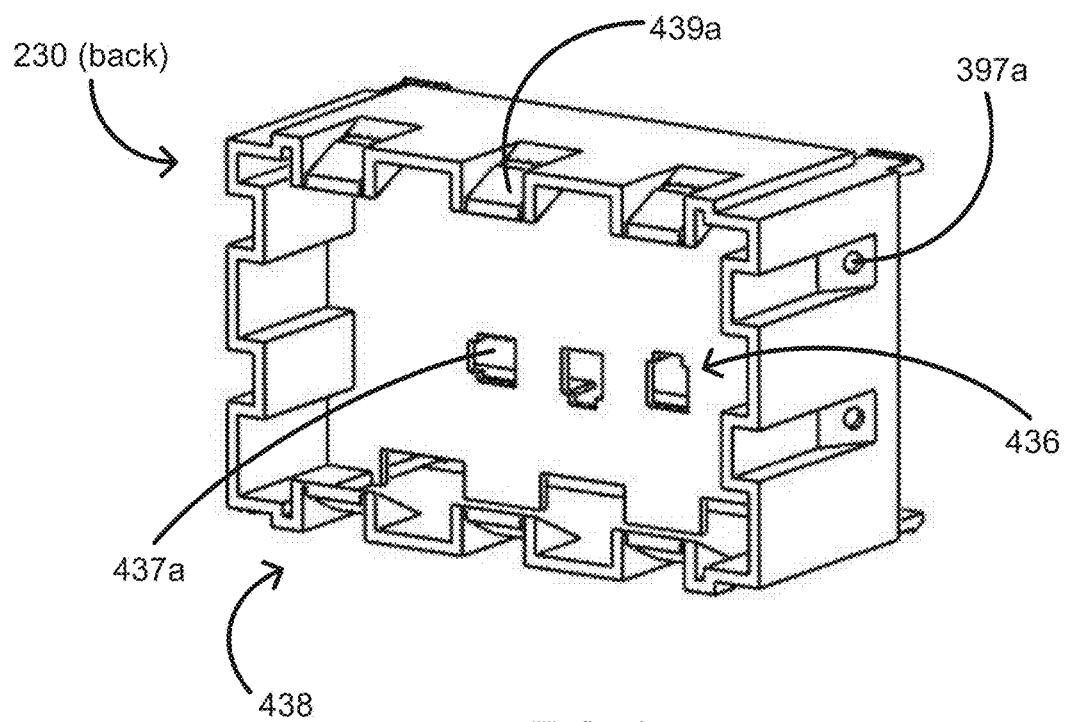
FIG. 4

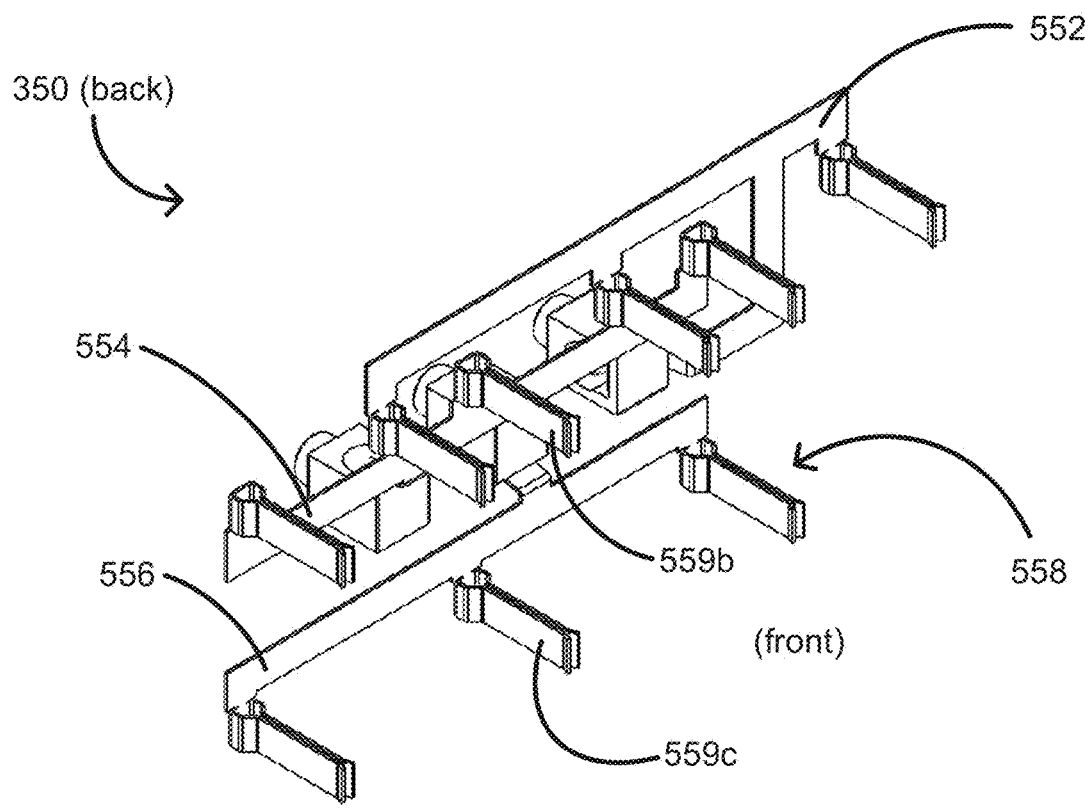
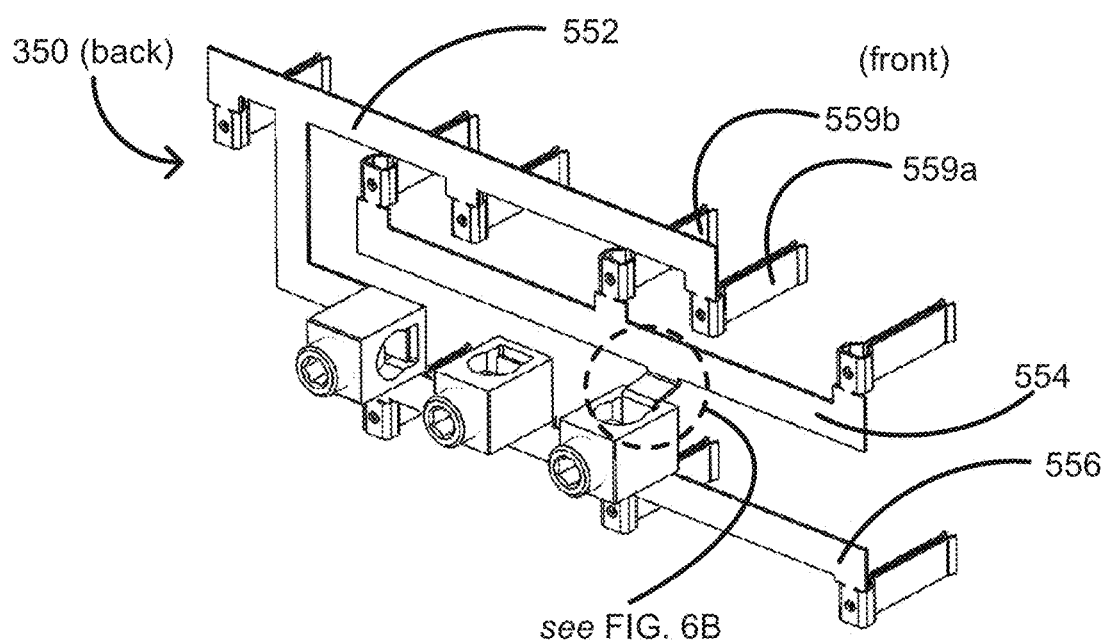
FIG. 5

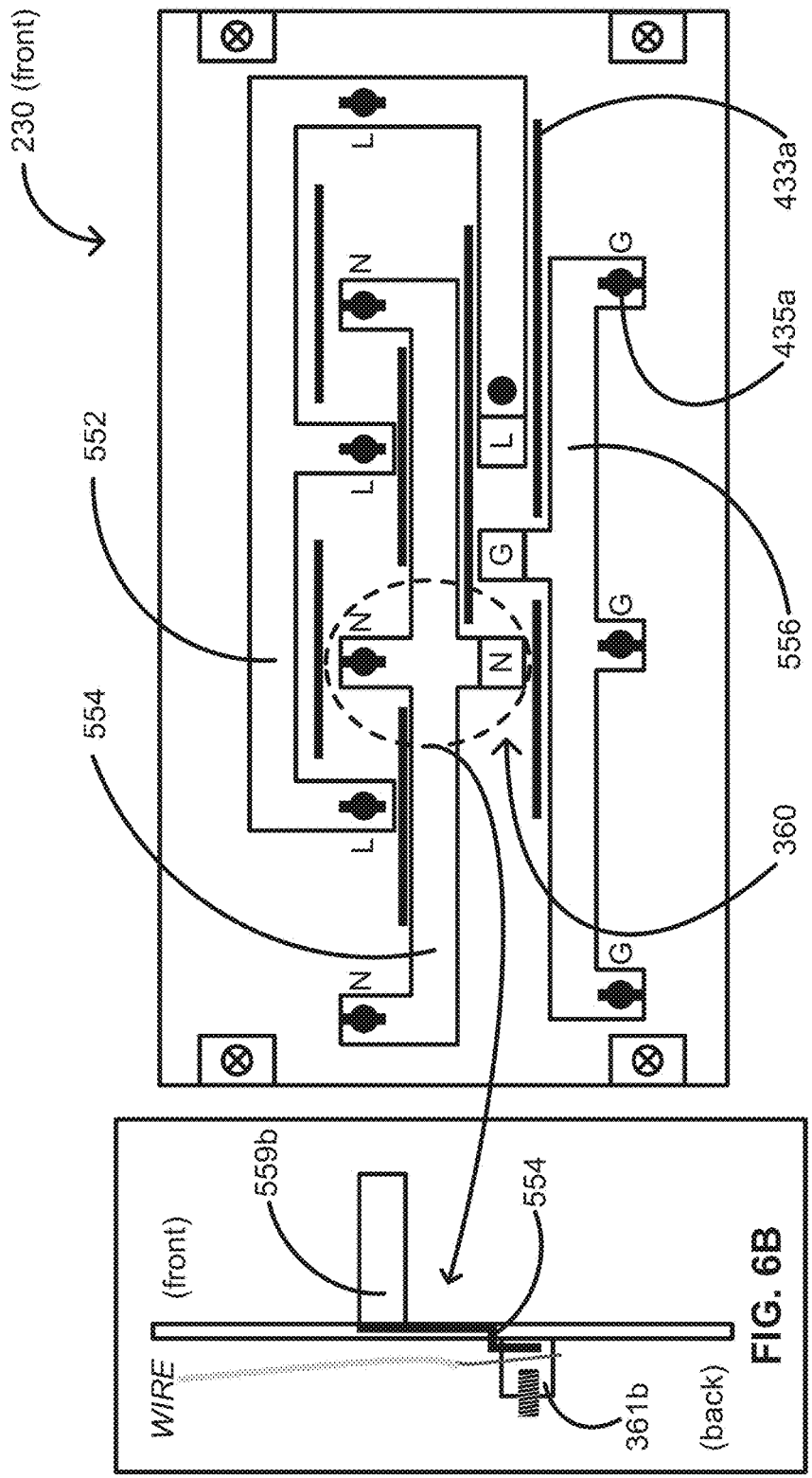

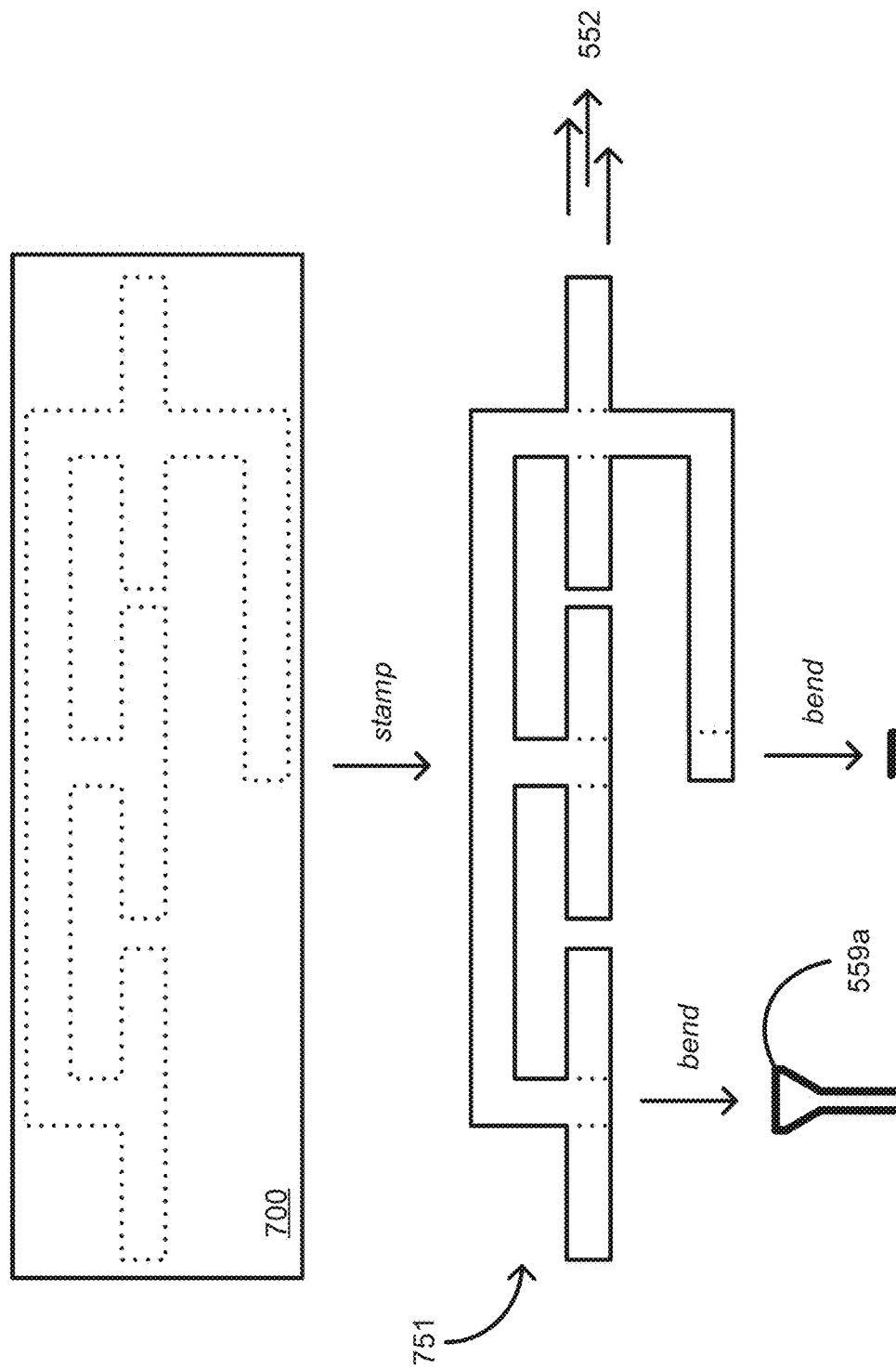

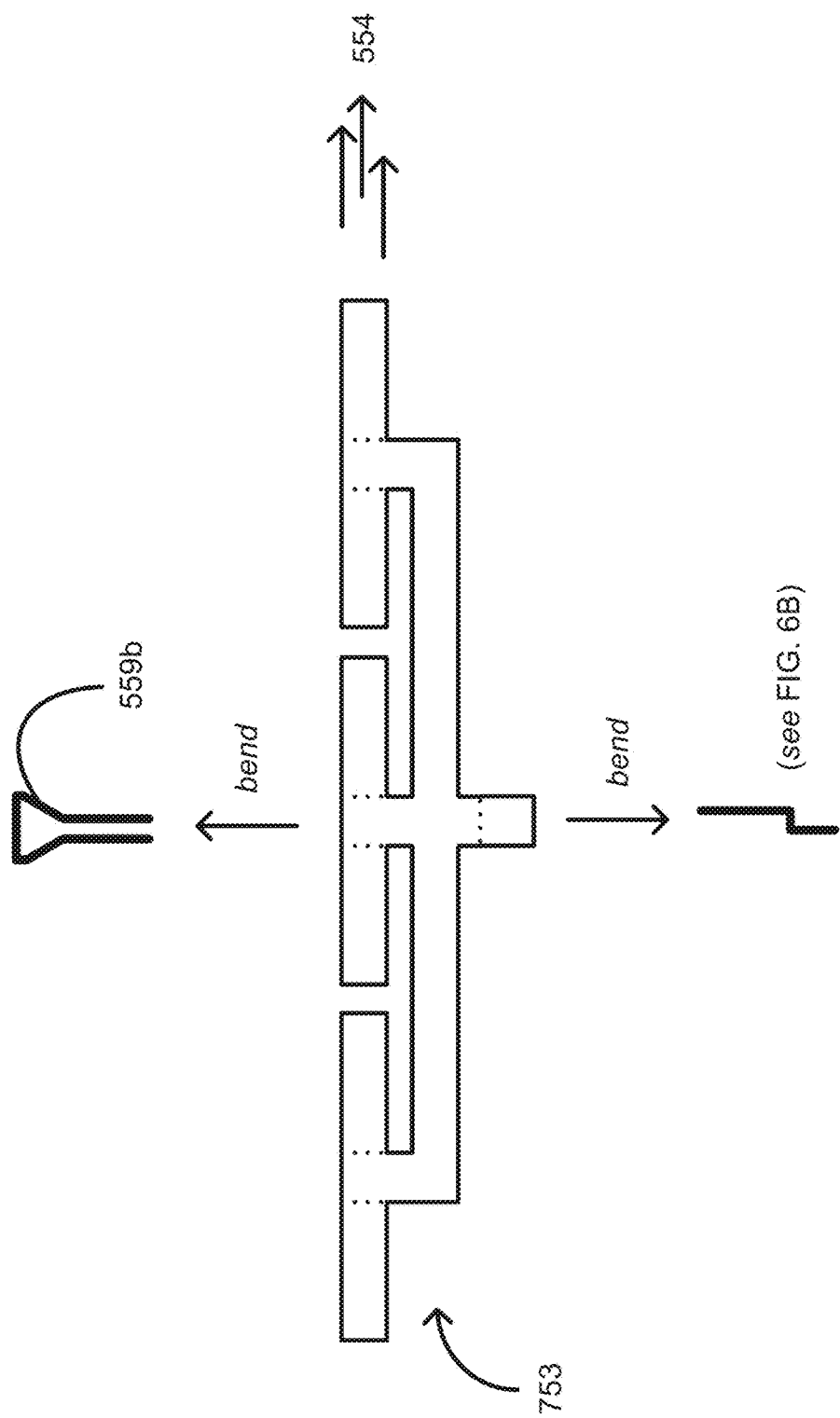

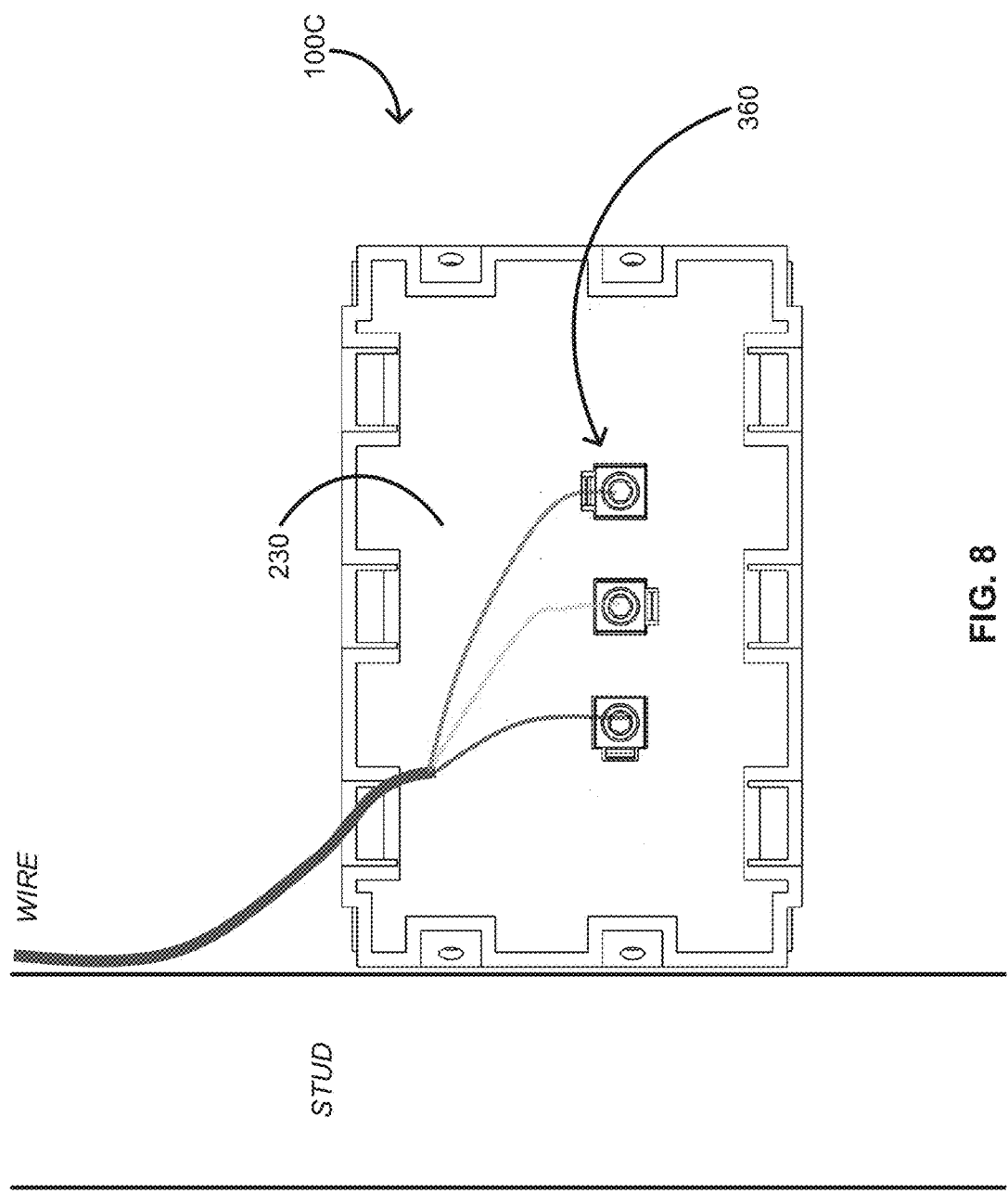

QUICK-CONNECT ELECTRICAL JUNCTION BOXES AND METHODS

CROSS-REFERENCE

This application claims the benefit of U.S. Provisional Patent Application No. 62/317,970, filed Apr. 4, 2016, which application is hereby incorporated herein by reference in its entirety.

BACKGROUND

Commercial and residential electrical wiring systems can be unnecessarily complicated from hard-wiring scenarios requiring endless pig tails connected with wiring nuts to adhering to prevailing and pertinent specifications from standards and safety bodies. Provided herein are systems including quick-connect electrical junction boxes and methods thereof that address unnecessarily complicated electrical wiring systems.

SUMMARY

Provided herein in some embodiments is a quick-connect electrical junction box including a front cover, a bus module, and a back cover configured to fit together and form the quick-connect electrical junction box. The front cover can include a front face including a number of sockets configured to accept up to an equal number of prongs of one or more electrical accessory modules. The front cover can also include a back face including a number of clamp tunnels corresponding to the number of sockets. The bus module can include a front face including a bus assembly fixed to the bus-module front face, wherein the bus assembly can include a number of clamps correspondingly disposed in the number clamp tunnels forming the number sockets in the front face. The bus module can also include a back face including a number of bus assembly-connected wire lugs fixed to the bus-module back face configured for wiring the quick-connect electrical junction box to a circuit breaker or another quick-connect electrical junction box.

In such embodiments, the bus-module front face can include a number of posts integral with the bus module. The bus assembly can include a number of through holes, through slots, or a combination thereof within which the number of posts are disposed. The bus assembly can be fixed to the bus-module front face by at least melted top portions of the number of posts melted over the number of the through holes, the through slots, or the combination thereof and adjacent areas of the bus assembly.

In such embodiments, the bus assembly can include a live bus, a neutral bus, and a ground bus. The live bus can be configured to connect to a live wire through a live-wire lug of the wire lugs. The neutral bus can be configured to connect to a neutral wire through a neutral-wire lug of the wire lugs. The ground bus can be configured to connect to a ground wire through a ground-wire lug of the wire lugs. The bus-module back face can be recessed such that the wire lugs can be fixed to the recessed bus-module back face.

In such embodiments, the bus-module front face can be recessed. The recessed bus-module front face can accommodate a number of projections configured as isolation barriers to isolate the live bus, the neutral bus, and the ground bus from each other.

In such embodiments, the bus assembly can be characteristic of stamping a nascent bus assembly from a sheet of a conductor and subsequently bending end portions of the nascent bus assembly to form the number of clamps of the bus assembly, as well as a number of lug connectors of the bus assembly. The number of clamp tunnels of the front cover can be configured to restrain the number of clamps from opening too widely and prevent damage to the number of clamps.

In such embodiments, the number of sockets can be organized into a number of gangs with up to three sockets per gang, wherein the up to three socket includes a live socket, a neutral socket, and a ground socket.

In such embodiments, the front-cover front face can be recessed to accommodate one or more electrical accessory modules selected from the group consisting of receptacles, switches, and other load modules.

Also provided herein in some embodiments is a wiring system including an electrical junction box and one or more electrical accessory modules. The quick-connect electrical junction box can include a front cover, a bus module, and a back cover configured to fit together and form the quick-connect electrical junction box. The front cover can include a front face including a number of sockets, and the front cover can also include a back face including a number of clamp tunnels corresponding to the number of sockets. The bus module can include a front face including a bus assembly fixed to the bus-module front face, wherein the bus assembly can include a number of clamps correspondingly disposed in the number clamp tunnels forming the number sockets in the front face. The bus module can also include a back face including a number of bus assembly-connected wire lugs fixed to the bus-module back face configured for wiring the quick-connect electrical junction box to a circuit breaker or another quick-connect electrical junction box. The number of sockets of the quick-connect electrical junction box can be configured to accept up to an equal number of prongs of the one or more electrical accessory modules.

In such embodiments, the bus-module front face can include a number of posts integral with the bus module. The bus assembly can include a number of through holes, through slots, or a combination thereof within which the number of posts are disposed. The bus assembly can be fixed to the bus-module front face by at least melted top portions of the number of posts melted over the number of the through holes, the through slots, or the combination thereof and adjacent areas of the bus assembly.

In such embodiments, the bus assembly can include a live bus, a neutral bus, and a ground bus. The live bus can be configured to connect to a live wire through a live-wire lug of the wire lugs. The neutral bus can be configured to connect to a neutral wire through a neutral-wire lug of the wire lugs. The ground bus can be configured to connect to a ground wire through a ground-wire lug of the wire lugs. The bus-module back face can be recessed such that the wire lugs can be fixed to the recessed bus-module back face.

In such embodiments, the bus-module front face can be recessed. The recessed bus-module front face can accommodate a number of projections configured as isolation barriers to isolate the live bus, the neutral bus, and the ground bus from each other.

In such embodiments, the bus assembly can be characteristic of stamping a nascent bus assembly from a sheet of a conductor and subsequently bending end portions of the nascent bus assembly to form the number of clamps of the bus assembly, as well as a number of lug connectors of the bus assembly. The number of clamp tunnels of the front cover can be configured to restrain the number of clamps from opening too widely and prevent damage to the number of clamps.

In such embodiments, the number of sockets can be organized into a number of gangs with up to three sockets per gang, wherein the up to three sockets include a live socket, a neutral socket, and a ground socket.

In such embodiments, the front-cover front face can be recessed to accommodate the one or more electrical accessory modules, wherein each electrical accessory module of the one or more electrical accessory modules is selected from a receptacle and a switch.

Also provided herein in some embodiments is a method including stamping and bending a sheet of a conductor to form a bus assembly; molding a front cover, a bus module, and a back cover of the quick-connect electrical junction box; and fitting together the front cover, the bus module with the bus assembly, and the back cover to form the quick-connect electrical junction box. Stamping to form the bus assembly can include stamping a nascent bus assembly from the sheet of the conductor, and bending to form the bus assembly can include bending end portions of the nascent bus assembly to form the bus assembly with a number of clamps. Molding the front cover of the quick-connect electrical junction box can include molding a front face of the front cover including a number of sockets configured to accept up to an equal number of prongs of one or more electrical accessory modules. Molding the front cover of the quick-connect electrical junction box can also include molding a back face of the front cover including a number of clamp tunnels corresponding to the number of sockets of the bus assembly. Molding a bus module and a back cover of the quick-connect electrical junction box can include molding a front face and a back face for each of the bus module and the back cover. Subsequent to molding the bus-module back face, a number of wire lugs can be fixed to the bus-module back face, wherein the wire lugs are configured for wiring the quick-connect electrical junction box to a circuit breaker or another quick-connect electrical junction box. Fitting together the front cover, the bus module, and the back cover to form the quick-connect electrical junction box can include correspondingly disposing the number of clamps of the bus assembly in the number clamp tunnels of the front cover, thereby forming the number sockets in the front face. The number of clamp tunnels of the front cover can be configured to restrain the number of clamps from opening too widely and prevent damage to the number of clamps.

In such embodiments, molding the bus module can further include molding a number of posts and a number of projections configured as bus-isolation barriers in the front face of the bus module.

In such embodiments, molding the bus module can further include molding a number of knock-out tabs in the bus module with dimensions such that any one of the knock-out tabs can be removed to accommodate at least incoming or outgoing electrical wiring in its place.

In such embodiments, the method can further include fixing the bus assembly to the bus-module front face. Fixing the bus assembly to the bus-module front face can include inserting a number of moldable posts of the bus module through a number of through holes, through slots, or a combination thereof stamped into the bus assembly. Fixing the bus assembly to the bus-module front face can further include melting at least top portions of the number of posts over the number of through holes, the through slots, or the combination thereof and adjacent areas of the bus assembly, thereby fixing the bus assembly to the bus-module front face.

In such embodiments, fixing the number of wire lugs to the bus-module back face can include fixing a live-wire lug to a live bus of the bus assembly, a neutral-wire lug to a neutral bus of the bus assembly, and a ground-wire lug to a ground bus of the bus assembly. The live-wire lug can be configured for connecting to a live wire, the neutral-wire lug can be configured for connecting to a neutral wire, and the ground-wire lug can be configured for connecting to a ground wire.

In such embodiments, the method can further include packaging the quick-connect electrical junction box in a package with mounting screws for mounting the quick-connect electrical junction box to a stud.

DRAWINGS

The multiple drawings refer to the example embodiments of the design.

FIG. 1A provides a schematic illustrating a one-gang quick-connect electrical junction box in accordance with some embodiments.

FIG. 1B provides a schematic illustrating a two-gang quick-connect electrical junction box in accordance with some embodiments.

FIG. 1C provides a schematic illustrating a three-gang quick-connect electrical junction box in accordance with some embodiments.

Figure 2:
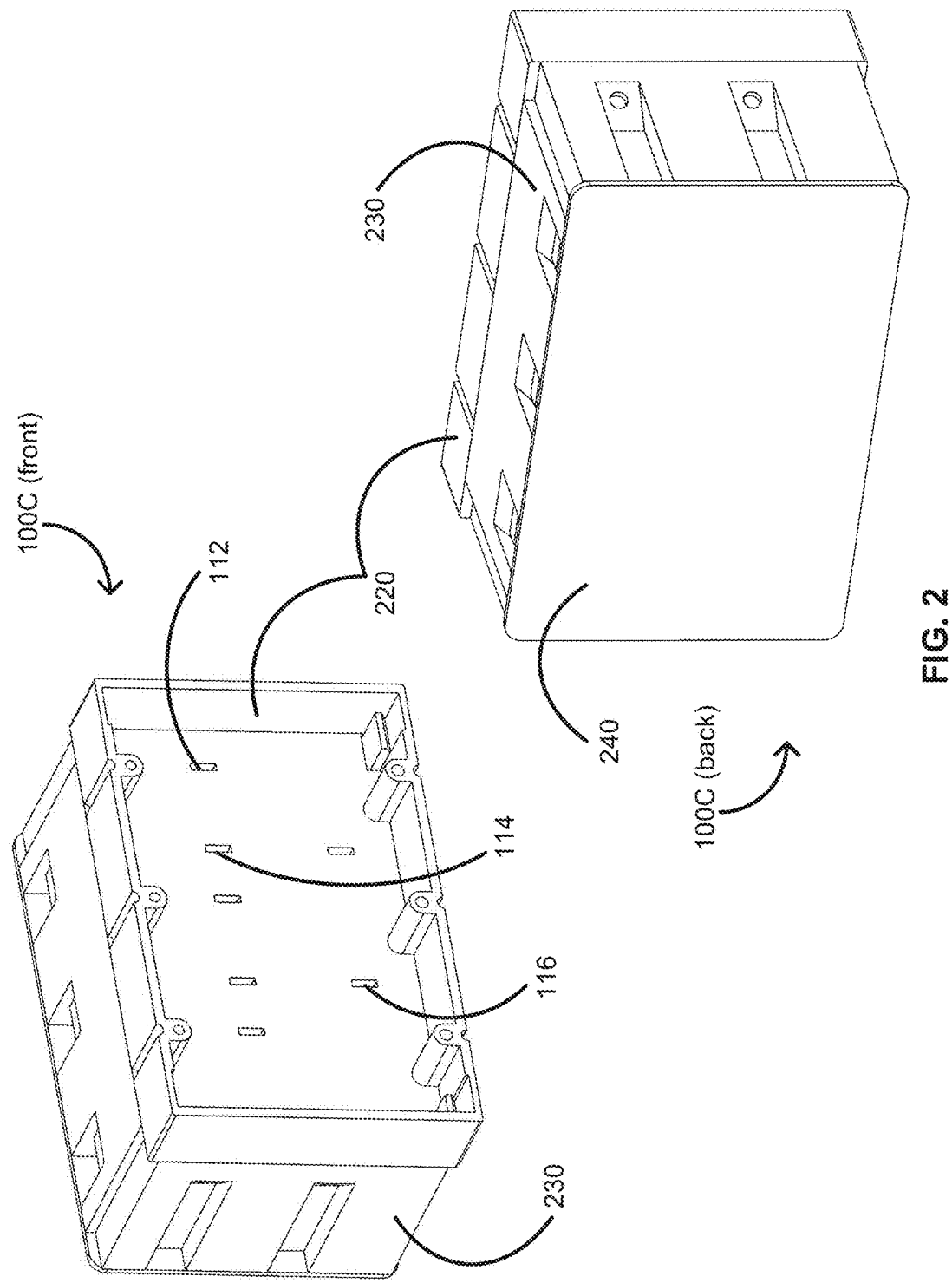

FIG. 2 provides schematics illustrating front and back perspective views of a three-gang quick-connect electrical junction box in accordance with some embodiments.

Figure 3A:
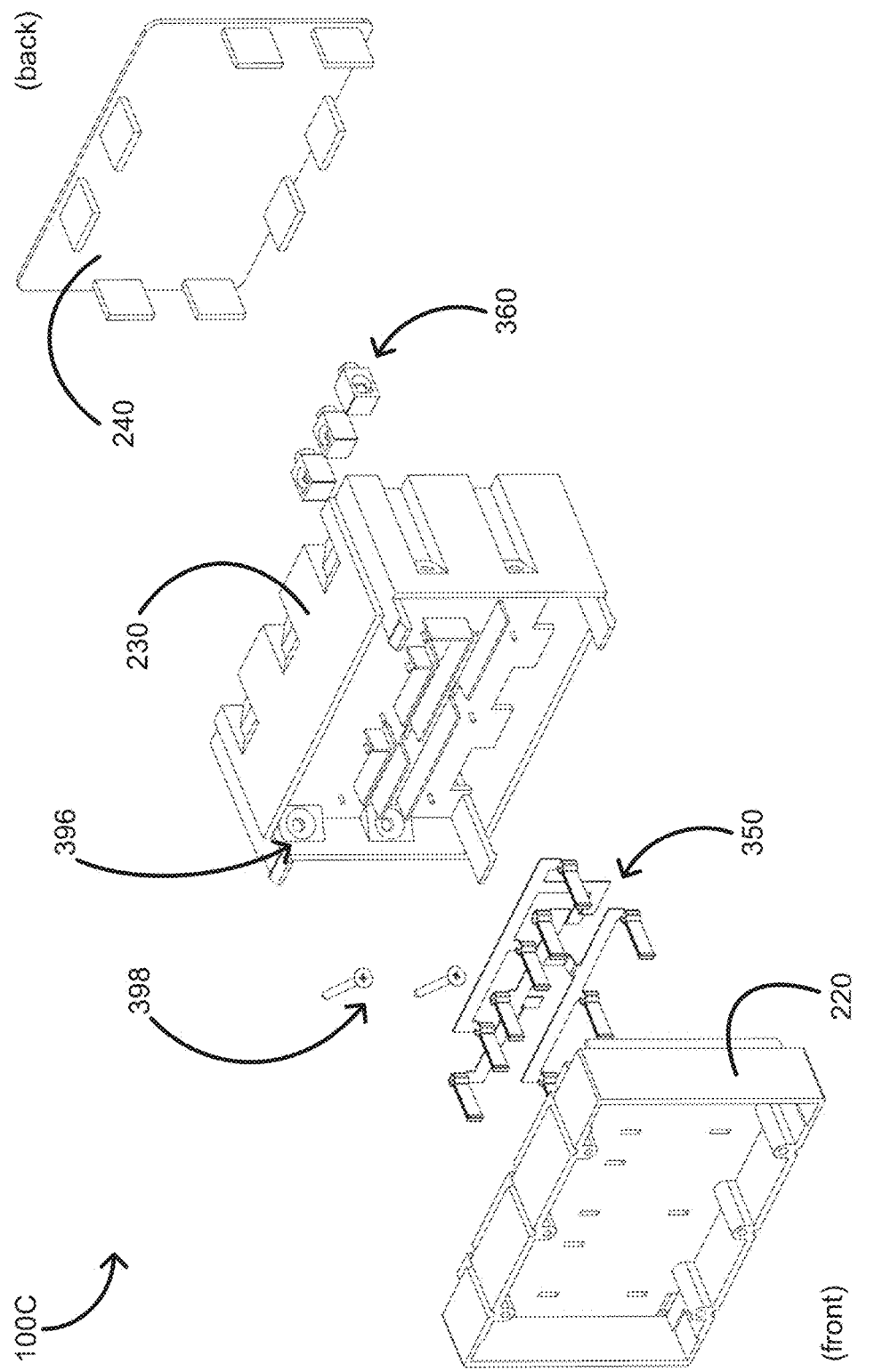

FIG. 3A provides a schematic illustrating an exploded view from a front of a three-gang quick-connect electrical junction box in accordance with some embodiments.

Figure 3B:
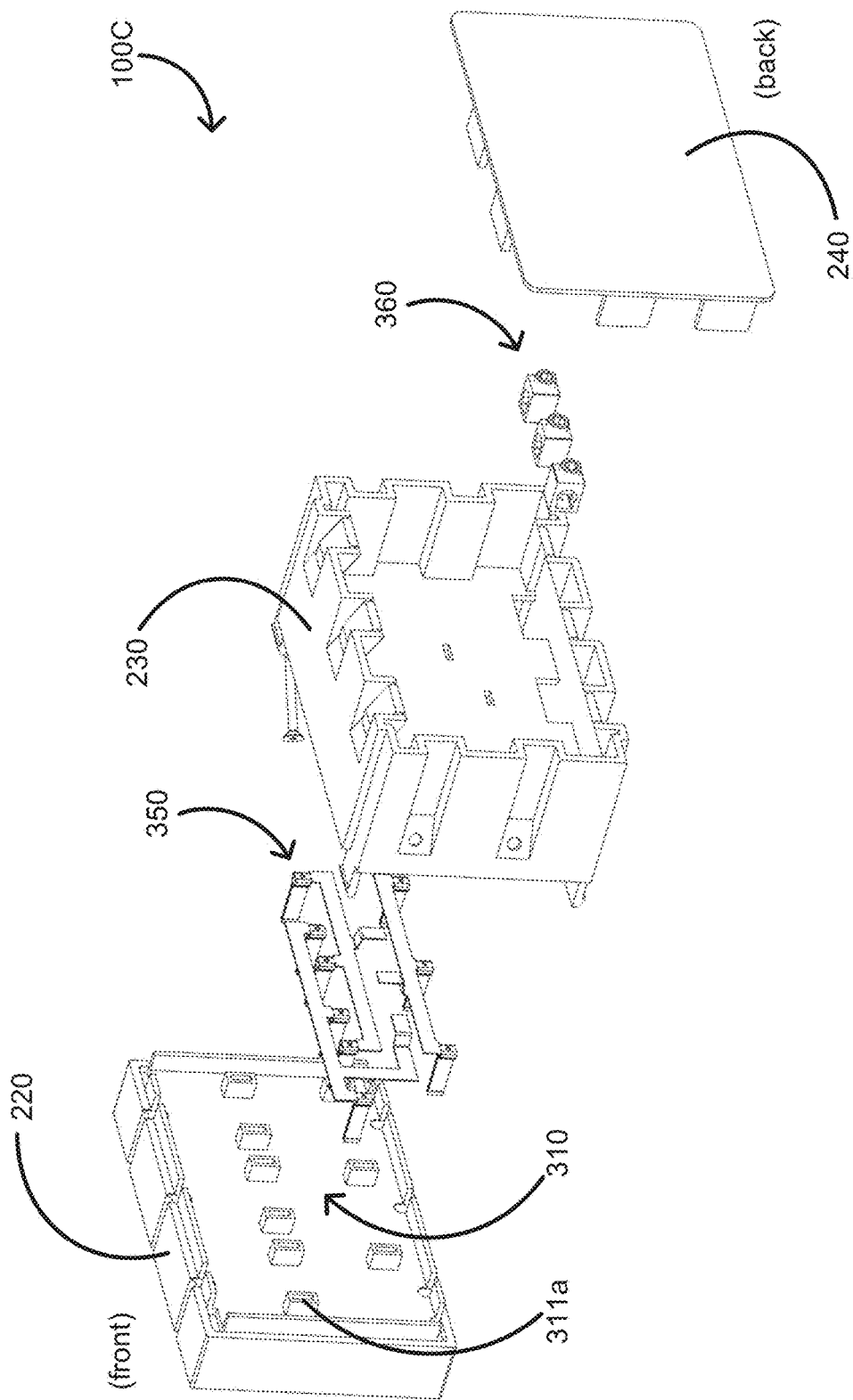

FIG. 3B provides a schematic illustrating an exploded view from a back of a three-gang quick-connect electrical junction box in accordance with some embodiments.

FIG. 4 provides schematics illustrating front and back perspective views of a bus module of an quick-connect electrical junction box in accordance with some embodiments.

FIG. 5 provides schematics illustrating front and back perspective views of a bus assembly of an quick-connect electrical junction box in accordance with some embodiments.

FIG. 6A provides a schematic illustrating a plan view of a bus assembly fixed in a bus module of an quick-connect electrical junction box in accordance with some embodiments.

FIG. 6B provides a schematic illustrating a side view of a bus assembly fixed in a bus module of a quick-connect electrical junction box in accordance with some embodiments.

FIG. 7A provides a schematic illustrating formation of a live bus portion of a bus assembly for a quick-connect electrical junction box in accordance with some embodiments.

FIG. 7B provides a schematic illustrating formation of a neutral bus portion of a bus assembly for a quick-connect electrical junction box in accordance with some embodiments.

Figure 7C:
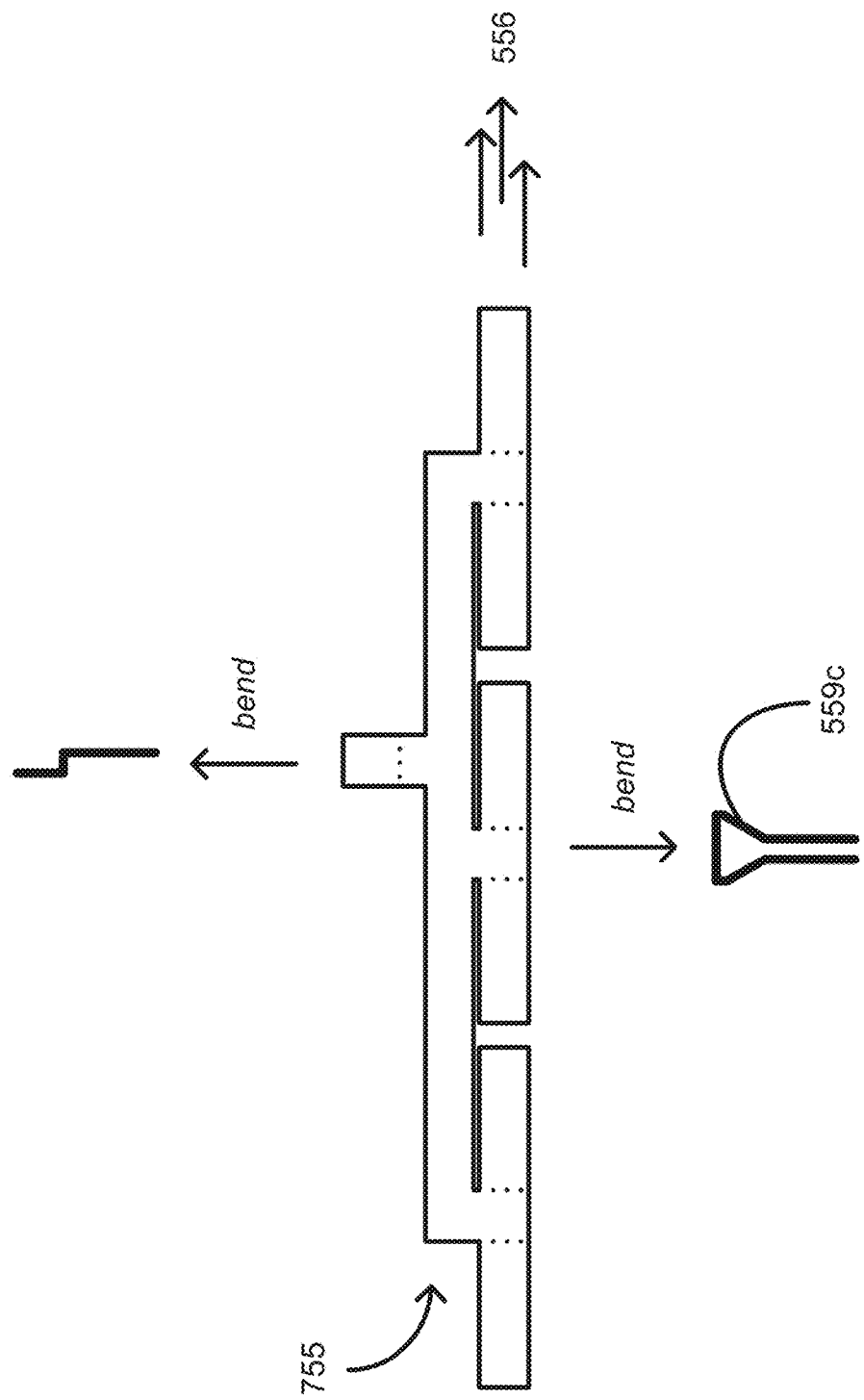

FIG. 7C provides a schematic illustrating formation of a ground bus portion of a bus assembly for a quick-connect electrical junction box in accordance with some embodiments.

FIG. 8 provides a schematic illustrating a quick-connect electrical junction box mounted on a stud in accordance with some embodiments.

Figure 9A:
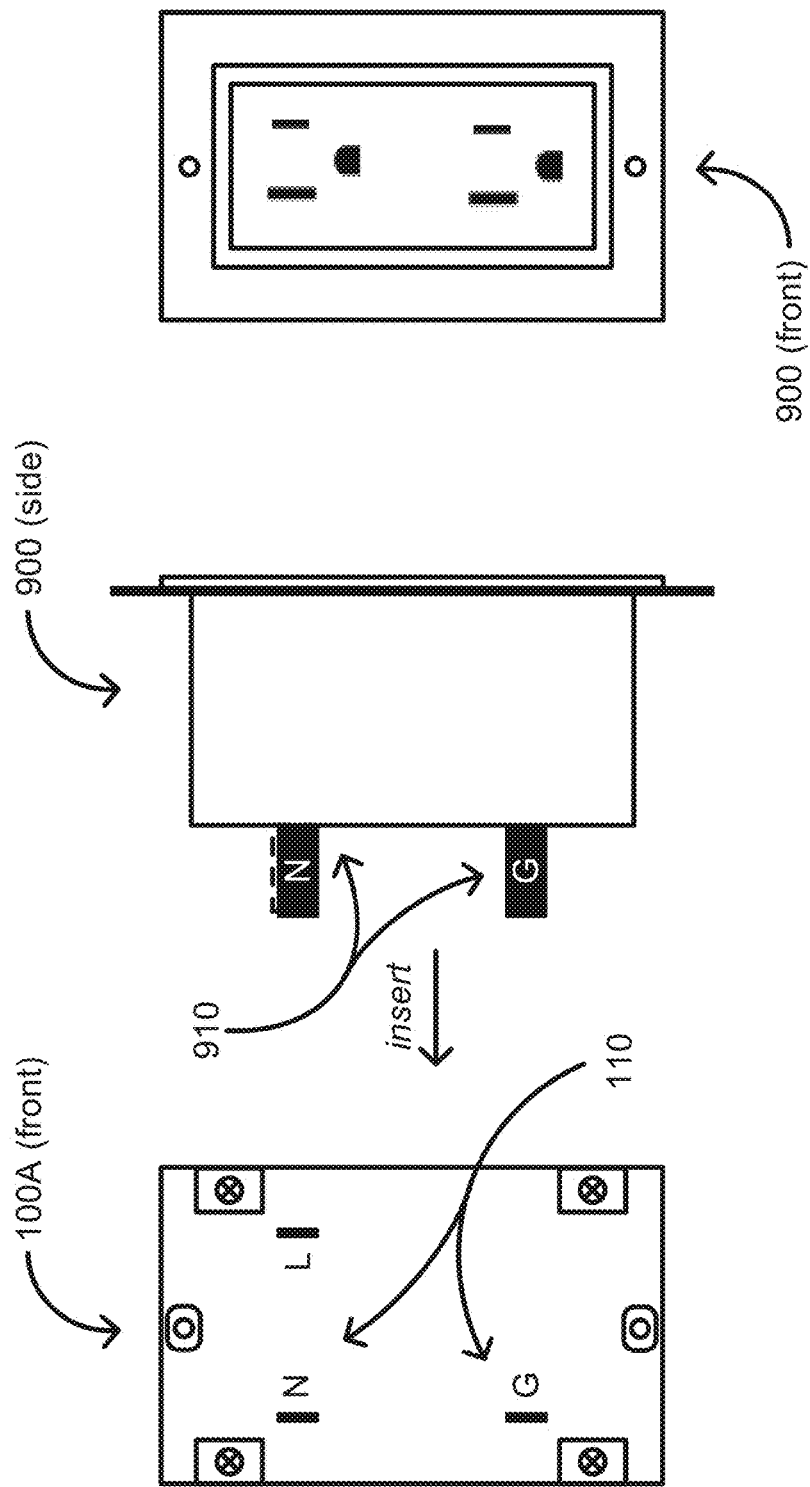

FIG. 9A provides a schematic illustrating a one-gang quick-connect electrical junction box configured to accept an electrical accessory module in accordance with some embodiments.

Figure 9B:
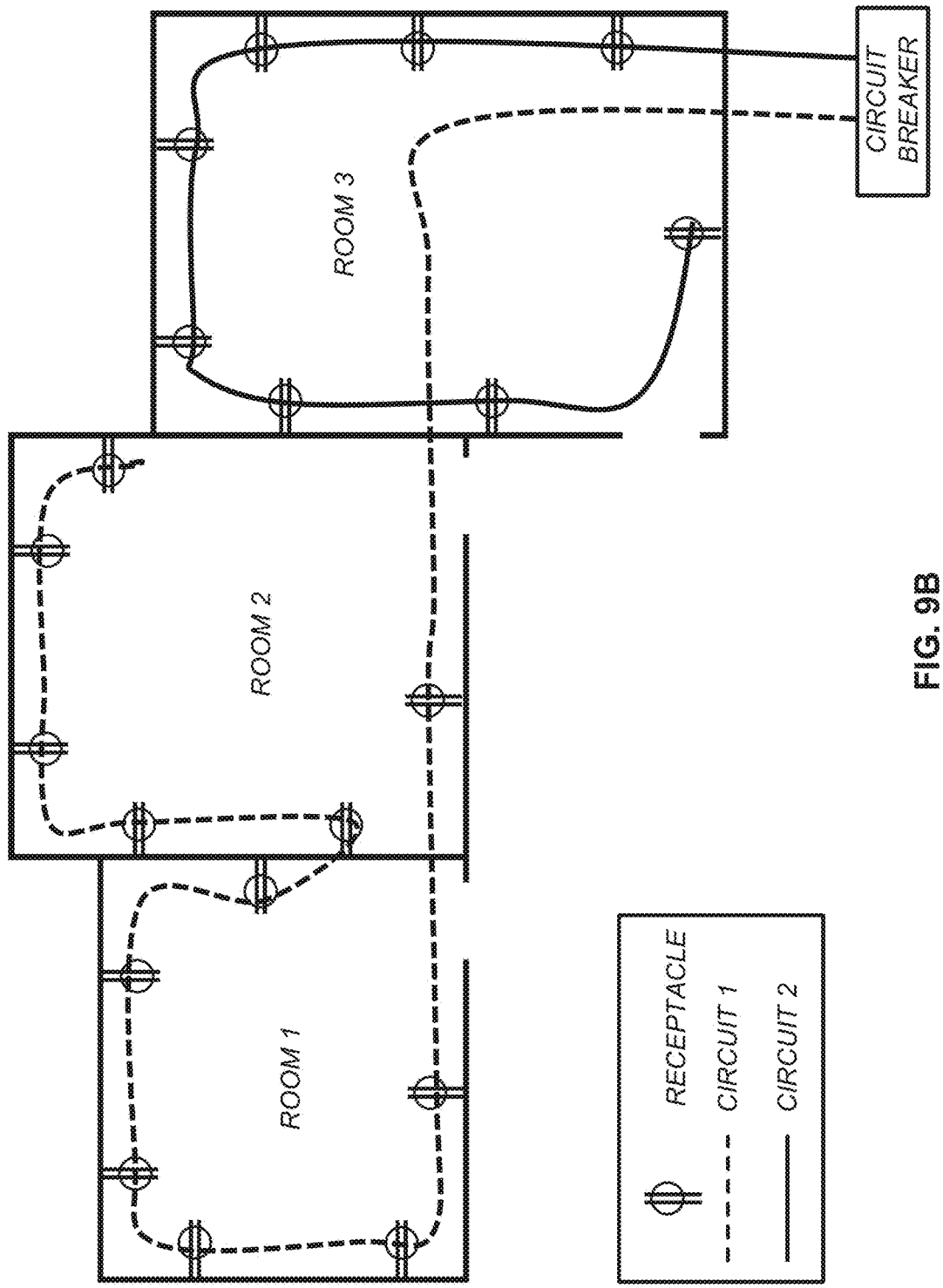

FIG. 9B provides a schematic illustrating an electrical wiring system in a number of rooms with a number of quick-connect electrical junction boxes and electrical accessory modules including power outlets in accordance with some embodiments.

Figure 10A:
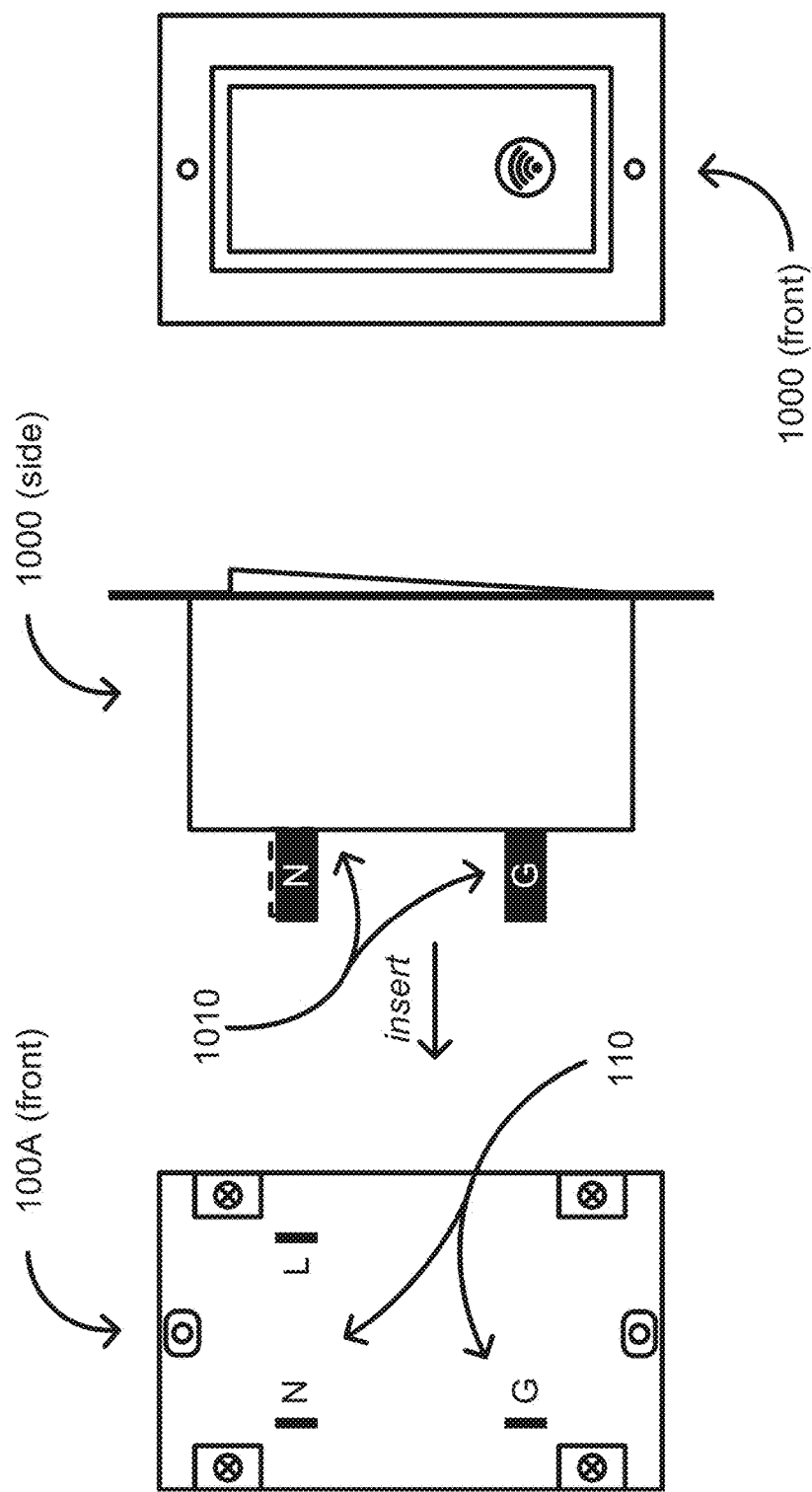

FIG. 10A provides a schematic illustrating a one-gang quick-connect electrical junction box configured to accept an electrical accessory module in accordance with some embodiments.

Figure 10B:
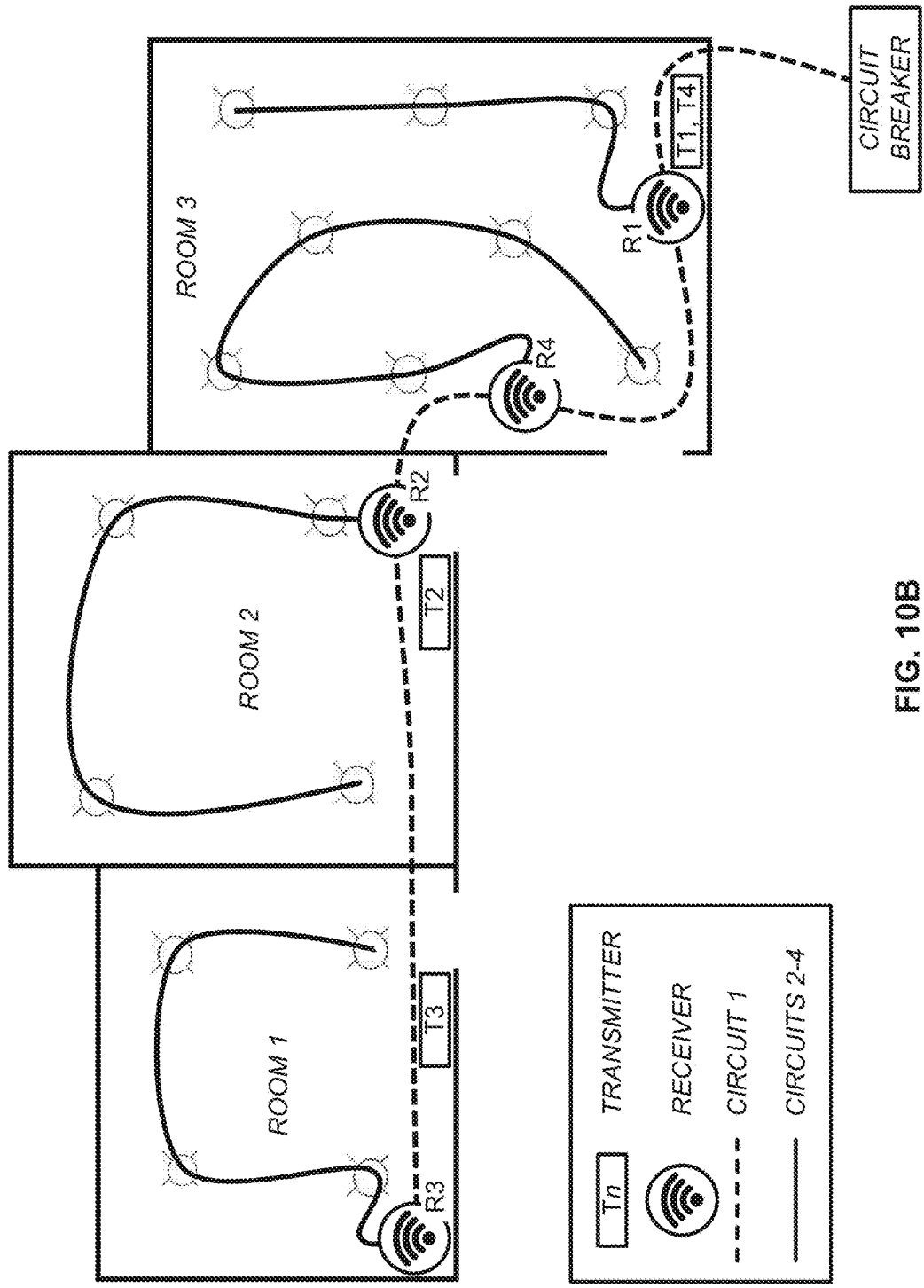

FIG. 10B provides a schematic illustrating an electrical wiring system in a number of rooms with a number of quick-connect electrical junction boxes and electrical accessory modules including light switches in accordance with some embodiments.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DESCRIPTION

In the following description, numerous specific details are set forth, such as examples of specific named components, connections, number of connections, etc., in order to provide a thorough understanding of the present design. It will be apparent; however, to one skilled in the art that the present design may be practiced without these specific details. In other instances, well known components or methods have not been described in detail but rather in a block diagram in order to avoid unnecessarily obscuring the present design. Thus, the specific details set forth are merely examples. The specific details discussed in one embodiment may be reasonably implemented in another embodiment. The specific details may be varied from and still be contemplated to be within the spirit and scope of the present design.

Unless defined otherwise, all technical and scientific terms used herein have the same meaning as commonly understood by those of ordinary skill in the art.

As used herein, "quick-connect electrical junction box" includes at least an electrical junction box with female sockets, examples of which are illustrated in FIGS. 1A-1C, 2, 3A, 3B, 6A, 8, 9A, 10A and described herein.

As used herein, both "bus module" and "bus carrier module" refer to the bus carrier module 230 illustrated in FIGS. 2, 3A, 3B, 4, 6A, and 8 and described herein.

Commercial and residential electrical wiring systems can be unnecessarily complicated from hard-wiring scenarios requiring endless pig tails connected with wiring nuts to adhering to prevailing and pertinent specifications from standards and safety bodies. Provided herein are systems including quick-connect electrical junction boxes and methods thereof that address unnecessarily complicated electrical wiring systems.

For example, provided herein in some embodiments is a quick-connect electrical junction box including a front cover, a bus module, and a back cover configured to fit together and form the quick-connect electrical junction box. The front cover can include a front face including a number of sockets configured to accept up to an equal number of prongs of one or more electrical accessory modules. The front cover can also include a back face including a number of clamp tunnels corresponding to the number of sockets. The bus module can include a front face including a bus assembly fixed to the bus-module front face, wherein the bus assembly can include a number of clamps correspondingly disposed in the number clamp tunnels forming the number sockets in the front face. The bus module can also include a back face including a number of bus assembly-connected wire lugs fixed to the bus-module back face configured for wiring the quick-connect electrical junction box to a circuit breaker or another quick-connect electrical junction box.

The quick-connect electrical junction box can be used in commercial and home installations. The quick-connect electrical junction box can be a female device in some embodiments that enables quick-connection to male pin-based electrical accessory modules including light switches, receptacles, and other electrical load modules. The male pins from an electrical accessory module can plug into female sockets of the quick-connect electrical junction box. An electrical accessory module can be ready to use once inserted into the quick-connect electrical junction box.

Traditionally electricians run electrical wires (e.g., Romex) from a circuit breaker to electrical junction boxes and daisy chain them for additional accessories. The electricians can continue to do the same, but, now, the electricians can substitute older electrical junction boxes with the quick-connect electrical junction boxes provided herein. Once the electrical wires are run to a quick-connect electrical junction box provided herein, the wires can be stripped, inserted into wire lugs of a bus carrier module, and tightly screwed. This makes power available through each of the buses of the bus carrier module. Any electrical accessory module can electrically connect to a quick-connect electrical junction box via, in at least some embodiments, inserting male pins into female sockets of the quick-connect electrical junction box. Thus, pig tails and tying the pig tails with wire nuts can be eliminated, which can otherwise take a tremendous amount of time during wiring of a house or a commercial building. As such, an object of the quick-connect electrical junction boxes provided herein is to enable an electrician to wire a house or a commercial building quickly and easily, as well as allow plug-and-play electrical accessory modules to be added to the quick-connect electrical junction boxes with significantly less time compared to the way it is done today.

Many advances have been made in home automation, particularly carrying out the function of lights, switches, and other load modules through Wi-Fi and other wireless standards. The quick-connect electrical junction boxes provided herein can take advantage of such advances and deliver a flexible infrastructure for all end points (e.g., light sources, outlets, fans, etc.). The quick-connect electrical junction boxes can deliver great value and results when installed during new home or commercial building construction. The quick-connect electrical junction box can also deliver similar value and results during home or commercial building remodeling. The quick-connect electrical junction box can provide a quick and easy way to wire a house or a commercial building.

Quick-Connect Electrical Junction Box

The quick-connect electrical junction box can include three distinct modules in some embodiments: 1) a front cover, 2) a bus carrier module, and 3) a back cover. In such embodiments, the combined front cover, the bus carrier module and the back cover can provide a volume that exceeds NEC requirements as well as electrical boxes that are available in the market.

The quick-connect electrical junction box can include different versions selected from a one-gang version, a two-gang version, a three-gang version or versions with a greater number of gangs. For much of the description provided herein, the three-gang version of the quick-connect electrical junction box is described; however, it should be understood that the description provided herein can apply to each version of the one-gang version, the two-gang version, and the three-gang version unless expressly indicated otherwise. For example, while the one-gang version can offer a one-to-one connection where each socket is directly connected to a wire lug, it can alternatively include a bus structure like that provided in reference to the three-gang quick-connect electrical junction box.

FIG. 1A provides a schematic illustrating a one-gang quick-connect electrical junction box 100A in accordance with some embodiments. FIG. 1B provides a schematic illustrating a two-gang quick-connect electrical junction box 100B in accordance with some embodiments. And FIG. 1C provides a schematic illustrating a three-gang quick-connect electrical junction box 100C in accordance with some embodiments.

As shown in FIGS. 1A-1C, each quick-connect electrical junction box of the quick-connect electrical junction boxes 100A, 100B, and 100C can include a number of sockets 110 configured to accept up to an equal number of prongs of one or more electrical accessory modules. (See FIG. 9A and FIG. 10A for example electrical accessory modules, respectively illustrating a receptacle 900 and a switch 1000.) The sockets 110 can be organized into a number of gangs with up to three sockets per gang. For example, the one-gang quick-connect electrical junction box 100A includes three sockets for the one gang of the one-gang quick-connect electrical junction box 100A, the two-gang quick-connect electrical junction box 100B includes three sockets per gang of the two-gang quick-connect electrical junction box 100B, and the three-gang electrical junction box 100C includes three sockets per gang of the three-gang quick-connect electrical junction box 100C. The three sockets can include a live socket 112 for connecting to a live wire, a neutral socket 114 for connecting to a neutral wire, and a ground socket 116 for connecting to a ground wire from a circuit breaker or another quick-connect electrical junction box.

FIG. 2 provides schematics illustrating front and back perspective views of the three-gang quick-connect electrical junction box 100C in accordance with some embodiments.

Using the three-gang quick-connect electrical junction box 100C as an example of the quick-connect electrical junction boxes provided herein, an quick-connect electrical junction box such as the quick-connect electrical junction box 100C of FIG. 2 can include a front cover 220, a bus module or bus carrier module 230, and a back cover 240. As shown, the front cover 220, the bus module 230, and the back cover 240 are configured to fit together and form the quick-connect electrical junction box 100C. Each of the front cover 220, the bus module 230, and the back cover 240 can be molded using a hard plastic or polymer consistent with prevailing but pertinent electrical specification and configured to fit together and form the quick-connect electrical junction box 100C.

As provided in reference to FIGS. 1A-1C, the quick-connect electrical junction boxes can include the sockets 110. As shown in FIG. 2, a front face of the front cover 220 can include the sockets 110, which front face can be recessed providing space to accommodate one or more electrical accessory modules. The number of sockets 110 can be configured to accept up to an equal number of prongs of one or more electrical accessory modules, and the sockets 100 can include the live socket 112, the neutral socket 114, and the ground socket 116.

FIG. 3A provides a schematic illustrating an exploded view from the front of the three-gang quick-connect electrical junction box 100C in accordance with some embodiments. And FIG. 3B provides a schematic illustrating an exploded view from the back of the three-gang quick-connect electrical junction box 100C in accordance with some embodiments.

Again, using the three-gang quick-connect electrical junction box 100C as an example of the quick-connect electrical junction boxes provided herein, an quick-connect electrical junction box such as the quick-connect electrical junction box 100C of FIGS. 3A and 3B can include the front cover 220, the bus module 230, and the back cover 240. Furthermore, each of the quick-connect electrical junction boxes provided herein can include a bus assembly 350 and a number of wire lugs 360 such as the bus assembly 350 and the wire lugs 360 shown for the quick-connect electrical junction box 100C of FIGS. 3A and 3B.

As shown in FIG. 3B, a back face of the front cover 220 can include a number of clamp tunnels 310, one of which is referenced as clamp tunnel 311a. The number of clamp tunnels 310 can correspond to the number of sockets 110. For example, the clamp tunnel 311a can correspond to the live socket 112 for connecting to a live wire of an AC electrical grid. As such, the clamp tunnel 311a can be referred to as a live-wire clamp tunnel. As provided in more detail herein, the bus assembly 350 can include a number of clamps 558 (see FIG. 5) correspondingly disposed in the number clamp tunnels 310 of the front cover 220, thereby forming the number sockets 110 in an quick-connect electrical junction box such as the quick-connect electrical junction box 100C. The clamp tunnels 310 of the front cover 220 can be configured to restrain clamps 558 from opening too widely when prongs of the one or more electrical accessory modules are inserted. As such, the clamp tunnels 310 can be configured to prevent damage to the clamps 558.

The front cover can serve a number of purposes. The front cover can cover the bus assembly and provide sockets for electrical accessory modules to be plugged into. Before the bus carrier module is securely mounted on a stud (see FIG. 8), the back cover 240 can be installed, the bus carrier module 230 can be installed with the screws 398 (e.g., two screws), and then the front cover 220 can be snapped into position on top of the bus carrier module 230. Also, on the back face of the front cover the clamp tunnels are configured to 1) keep the clamps in place, and 2) the limited opening of the clamp tunnels guarantees how far apart the clamps can open, thereby delivering a tight grip on the pins of the electrical accessory modules (e.g., the switches, the outlets, etc.). Once an electrical accessory device is in place, it can be secured with a couple of screws (e.g., one screw at the top and one screw at the bottom) just like how switches, outlets, and the like are secured today. Advantageously, the front cover of the quick-connect electrical junction box is designed to be removed along with the screws 398, if an additional wiring run needs to be added.

As shown in FIG. 3A, a front face of the bus module 230 can include features to accommodate the bus assembly 350, which features can include a recessed front face of the bus module 230 providing space to accommodate the bus assembly 350. And as shown in FIG. 3B, a back face of the bus module 230 can include features to accommodate the wire lugs 360, which features can include a recessed back face of the bus module 230 providing space to accommodate the wire lugs 360. The recessed back face of the bus module 230 can also provide space to accommodate any incoming electrical wiring, outgoing electrical wiring, or both incoming and outgoing electrical wiring. The bus module 230 can further include screw holes 396 (see also screw hole 397a of FIG. 4) for mounting the quick-connect electrical junction box 100C on a stud (see FIG. 8) with screws 398, which screws can be provided in a package with an quick-connect electrical junction box. In some embodiments, the screws are captive screws, captive in the bus module 230.

Again, the front cover 220, the bus module 230, and the back cover 240 can be configured to fit together and form the quick-connect electrical junction box 100C. As shown in FIGS. 3A and 3B, the front cover 220 and the bus module 230 can be configured to lock together by a locking mechanism including locking tabs extending from sides of the bus module 230 and corresponding locking-tab through slots through the front face of the front cover 220. As further shown in FIGS. 3A and 3B, the bus module 230 and the back cover 240 can be configured to fit together by an interference fit of sufficient interference to hold the bus module 230 and the back cover 240 together during a typical lifetime of the quick-connect electrical junction box. The interference fit can include peripherally arranged tabs projecting from a front face of the back cover 240 and corresponding slots in inner sidewalls of the back face of the bus module 230.

The back cover can be a protective cover for the bus carrier module making sure nothing is left exposed.

FIG. 4 provides schematics illustrating front and back perspective views of the bus module 230 of the quick-connect electrical junction box 100C in accordance with some embodiments.

As shown in FIG. 4, a bus module of a quick-connect electrical junction box such as the bus module 230 of the quick-connect electrical junction box 100C can include a number of bus-isolation barriers 432 and a number of posts 434 in a front face of the bus module 230, a number of wire-lug mounts 436 configured for mounting the number of wire lugs 360 in a back face of the bus module 230, and knock-out tabs 438 located in one or more sides (e.g., at the top and bottom) of the bus module 230. The front face of the bus module 230 and the back face of the bus module 230 can be considered opposite faces of a bus carrier plane in a center portion of the bus module 230.

The bus-isolation barriers 432 can be integral projections molded with the front face of the bus module 230. As provided in more detail herein, the bus-isolation barriers 432 can be collectively configured to isolate a live bus 552, a neutral bus 554, and a ground bus 556 of the bus assembly 350 from each other. (See FIG. 6A.) A single bus-isolation barrier 433a of the bus-isolation barriers 432 is shown in both FIG. 4 and FIG. 6A. In FIG. 6A, the bus-isolation barrier 433a is shown isolating the live bus 552 from the ground bus 556.

The posts 434 can be integral projections molded with the front face of the bus module 230. As provided in more detail herein, the number of posts 434 can be configured for insertion through a number of through holes, through slots, or a combination thereof stamped into the bus assembly 350. (See FIG. 6A.) A single post 435a of the posts 434 is shown in both FIG. 4 and FIG. 6A. In FIG. 6A, the post 435a is shown through a through slot of the ground bus 556 and melted over the through slot and adjacent areas of the ground bus 556.

The wire-lug mounts 436 can be through holes molded with the back face or cut out of the back face of the bus module 230. The through holes of the wire-lug mounts 436 can be shaped and sized to allow the wire lugs 360 to sit in the through holes and be fixed (e.g., adhered with an adhesive or solvent weld) thereto. Alternatively, the through holes of the wire-lug mounts 436 can be shaped and sized to allow rabbeted wire lugs 360 to sit in and over the through holes and be fixed (e.g., adhered with an adhesive or solvent weld) thereto. Whether the through holes of the wire-lug mounts 436 are configured for the wire lugs 360 to sit in or over the through holes, the through holes can be further configured to accommodate lug-connecting portions of the bus assembly 350 to pass from the front face of the bus module 230 through the through holes to the back face of the bus module 230. A single wire-lug mount 437a of the wire-lug mounts 436 is also shown in FIG. 4.

As an alternative to the through-hole wire-lug mounts 436 of FIG. 4, the wire lugs 360 can be directly fixed (e.g., adhered with an adhesive or solvent weld) to portions of the back face of the bus module 230. However, through holes adjacent the portions of the back face can still be molded with the front face or cut out of the front face to accommodate the lug-connecting portions of the bus assembly 350 to pass from the front face of the bus module 230 through the through holes to the back face of the bus module 230. Such an embodiment is shown in FIG. 3B.

The knock-out tabs 438 can be in one or more sides (e.g., at the top and bottom) of the bus module 230, and each tab of the knock-out tabs 438 can be knocked-out to accommodate at least incoming or outgoing electrical wiring through a resulting through hole. A single knock-out tab 439a of the knock-out tabs 438 is also shown in FIG. 4.

The bus carrier module can include the bus assembly that provides power to plugged-in appliances. The bus assembly can be mounted on the front side of the bus carrier module with clamps clearly visible, whereas the other ends of the bus assembly can be connected to the wire lugs located at the back of the bus carrier module. Also, bus-isolation barriers can prevent any unwanted flow of power leakage between the busses of the bus assembly. The bus carrier module can be designed to be mounted on a stud during construction or a remodel. A template can be packaged with the quick-connect electrical junction box that will allow an electrician to mount the quick-connect electrical junction box so that the front cover is flush with the outer sheetrock's surface. Knock-out tabs can be provided and can be removed to insert electric wires such as those from Romex into the back of the bus carrier module. The wires can then be stripped and inserted into the wire lugs to deliver power through the bus assembly. Knock-out tabs can also be available at the top or the bottom of the bus carrier module. As such, wires can be fed in from the top or the bottom of the bus carrier module, if needed. Based on this design, installations should not require more than 2 Romex (e.g., one for power in, and one for power out to another quick-connect electrical junction box or circuit breaker), regardless of number of gangs. The wire lugs provide enough space to insert up to 3, 12-gauge wires.

FIG. 5 provides schematics illustrating front and back perspective views of the bus assembly 350 of the quick-connect electrical junction box 130C in accordance with some embodiments.

As shown in FIG. 5, the bus assembly 350 can include a live bus 552, a neutral bus 554, and a ground bus 556, each of which can include a number of clamps 558 that can be correspondingly disposed in the number of clamp tunnels 310 of the front cover 220, thereby forming the number sockets 110 in a quick-connect electrical junction box such as the quick-connect electrical junction box 100C. One such clamp is live-bus clamp 559*a* shown in both FIG. 5 and FIG. 7A. Another such clamp is neutral-bus clamp 559*b* shown in each of FIGS. 5, 6B, and 7B. Yet another such clamp is ground-bus clamp 559*c* shown in both of FIGS. 5 and 7C. It should be understood that the bus assembly of the one-gang quick-connect electrical junction box 100A need only include a single live-bus clamp, a single neutral-bus clamp, and a single ground-bus clamp. Likewise, the two-gang quick-connect electrical junction box 100B need only include a pair of live-bus clamps, a pair of neutral-bus clamps, and a pair of ground-bus clamps.

As provided in more detail in reference to FIG. 6B, FIG. 5 also shows a lug-connecting portion of the neutral bus 554 in a bent configuration for passing from the front face of the bus module 230 through a through hole to the back face of the bus module 230. In such a fashion, the neutral bus 554 can be configured to connect to a neutral wire through a neutral-wire lug of the wire lugs 360. Likewise, the live bus 552 can be configured to connect to a live wire through a live-wire lug of the wire lugs 360, and the ground bus 556 can be configured to connect to a ground wire through a ground-wire lug of the wire lugs 360.

The bus assembly can be constructed with 18-gauge sheet metal by stamping the sheet metal to form shapes needed for the live, neutral, and ground buses. The live, neutral, and ground buses can be mounted on a bus carrier plane of the bus carrier module with clamps facing the clamp tunnels of the front cover while inserting the wire-lug connecting portions of the buses into the wire lugs on the back of the bus carrier plane. The clamps need not be separate pieces, as the clamps can be shaped from the stamped sheet metal and creased into clamps. The width of a bus can be approximately ¼. The buses can include mounting holes corresponding to the through holes, through slots, or a combination thereof described herein. Each of the buses can be pushed down by aligning the mounting holes to pins/posts on the bus carrier plane followed by melting the posts 434, using a heat press, down to the bus assembly metal, thereby locking the buses in place.

As provided in further detail in reference to FIGS. 7A-7C, the bus assembly 350 can be characteristic of stamping a nascent bus assembly from a sheet of a conductor and subsequently bending end portions of the nascent bus assembly to form the clamps 558 of the bus assembly 350, as well as a number of lug connecting portions or lug connectors of the bus assembly 350. "Characteristic of stamping" is intended to include one or more distinguishing features of a stamping process including stamping artifacts such as stamping imperfections or mechanical stresses. Likewise, "characteristic of bending" is intended to include one or more distinguishing features of a bending process including bending artifacts such as bending imperfections or mechanical stresses.

FIG. 6A provides a schematic illustrating a plan view of the bus assembly 350 fixed in the bus module 230 of the quick-connect electrical junction box 130C in accordance with some embodiments. FIG. 6B provides a schematic illustrating a side view of the bus assembly 350 fixed in the bus module 230 of the quick-connect electrical junction box 130C in accordance with some embodiments.

As shown in FIG. 6A, the bus assembly 350 can include the live bus 552, the neutral bus 554, and the ground bus 556, each of which can include a number of through holes, through slots, or a combination thereof within which the number of posts 434 can be disposed. One such post 435*a* of the posts 434 is shown in FIG. 6A through a through slot of the ground bus 556. In addition to the posts 434 being disposed in the through holes, through slots, or the combination thereof of the bus assembly 350, top portions of the posts can be melted (with use of heat, solvent, or a combination thereof) over the through holes, the through slots, or the combination thereof and adjacent areas of the bus assembly 350 to fix the bus assembly 350 to the bus module 230. The diameter of the post 435*a*, which is illustrated as greater than the width of the through slot of the ground bus 556 through which the post 453*a* is disposed, is intended to show the top portion of the post 435*a* melted over the through slot and an adjacent area of the ground bus 556.

One or more lug-connecting portions of the bus assembly 350 can be in a bent configuration for passing from the front face of the bus module 230 through a through hole of the bus module 230 to the back face of the bus module 230 where the lug-connecting portions can connect to wire lugs 360. As shown in FIG. 6B, for example, a lug-connecting portion of the neutral bus 554 is in a bent configuration for passing from the front face of the bus module 230 through a through hole of the bus module 230 to the back face of the bus module 230 where the lug-connecting portion can connect to wire lug 361*b*. In such a fashion, the back face of the bus module 230 can include a number of bus assembly-connected wire lugs fixed to the bus-module back face configured for wiring a quick-connect electrical junction box to a circuit breaker or another quick-connect electrical junction box.

FIG. 7A provides a schematic illustrating formation of the live bus 552 of the bus assembly 350 for the quick-connect electrical junction box 100C in accordance with some embodiments.

As shown in FIG. 7A, the live bus 552 can be formed in a metalworking process including any of a number of stamping and bending steps. The metalworking process can start with stamping a nascent live-bus assembly 751 from a sheet of a conductor 700 such as a sheet of metal (e.g., brass, copper, etc.). Stamping the nascent live-bus assembly 751 can include stamping the through holes, the through slots, or the combination thereof in the same or a different stamping step. End portions of the nascent live-bus assembly 751 can be subsequently bent to form the live bus 552 including the clamps 558 such as the live-bus clamp 559*a*, as well as the lug-connecting portion of the live-bus 552.

FIG. 7B provides a schematic illustrating formation of the neutral bus 554 of the bus assembly 350 for the quick-connect electrical junction box 100C in accordance with some embodiments.

As shown in FIG. 7B, the neutral bus 554 can also be formed in a metalworking process including any of a number of stamping and bending steps. The metalworking process can start with stamping a nascent neutral-bus assembly 753 from a sheet of a conductor such as the sheet of conductor 700. Stamping the nascent neutral-bus assembly 753 can include stamping the through holes, the through slots, or the combination thereof in the same or a different stamping step. End portions of the nascent neutral-bus assembly 753 can be subsequently bent to form the neutral bus 554 including the clamps 558 such as the neutral-bus clamp 559*b*, as well as the lug-connecting portion of the neutral-bus 554.

FIG. 7C provides a schematic illustrating formation of the ground bus 556 of the bus assembly 350 for the quick-connect electrical junction box 100C in accordance with some embodiments.

As shown in FIG. 7C, the ground bus 556 can also be formed in a metalworking process including any of a number of stamping and bending steps. The metalworking process can start with stamping a nascent ground-bus assembly 755 from a sheet of a conductor such as the sheet of conductor 700. Stamping the nascent ground-bus assembly 755 can include stamping the through holes, the through slots, or the combination thereof in the same or a different stamping step. End portions of the nascent ground-bus assembly 755 can be subsequently bent to form the ground bus 556 including the clamps 558 such as the ground-bus clamp 559c, as well as the lug-connecting portion of the ground-bus 554.

Subsequent to formation of each of the live bus 552, the neutral bus 554, and the ground bus 556, the bus assembly 350 can be disposed in the bus module 230 and fixed in the bus module 230. Disposing the bus assembly 350 in the bus module 230 can include placing or positioning the bus assembly 350 in the bus module 230 such that the posts 434 of the bus module 230 are disposed in the through holes, the through slots, or the combination thereof of the bus assembly 350. In addition, the lug-connecting portions of the bus assembly 350 can be disposed in the through holes therefor in the bus module 230 for connecting to the wire lugs 360. Fixing the bus assembly 350 in the bus module 230 can include melting top portions of the posts 434 with heat, solvent, or a combination thereof over the through holes, the through slots, or the combination thereof and adjacent areas of the bus assembly 350, thereby to fixing the bus assembly 350 to the bus module 230.

FIG. 9A provides a schematic illustrating the one-gang quick-connect electrical junction box 100A configured to accept an electrical accessory module 900 in accordance with some embodiments.

As shown in FIG. 9A, the electrical accessory module 900 can be configured as a receptacle or outlet, and the electrical accessory module 900 can be inserted into the quick-connect electrical junction box 100A, which includes a recessed front face to accommodate the electrical accessory module 900. The number of sockets 110 of the quick-connect electrical junction box 100A can be configured to accept up to an equal number of prongs 910 of the electrical accessory module 900. The prongs 910 of the electrical accessory module 900 can include a live prong, a neutral prong, and a ground prong configured to match the live socket 112, the neutral socket 114, and the ground socket 116 of the prongs 110 of the quick-connect electrical junction box 100A.

FIG. 10A provides a schematic illustrating the one-gang quick-connect electrical junction box 100A configured to accept an electrical accessory module 1000 in accordance with some embodiments.

As shown in FIG. 10A, the electrical accessory module 1000 can be configured as a switch (e.g., a light switch that includes a wireless receiver), and the electrical accessory module 1000 can be inserted into the quick-connect electrical junction box 100A, which includes a recessed front face to accommodate the electrical accessory module 1000. The number of sockets 110 of the quick-connect electrical junction box 100A can be configured to accept up to an equal number of prongs 1010 of the electrical accessory module 1000. The prongs 1010 of the electrical accessory module 1000 can include a live prong, a neutral prong, and a ground prong configured to match the live socket 112, the neutral socket 114, and the ground socket 116 of the prongs 110 of the quick-connect electrical junction box 100A.

Additional Technical Details

An embodiment of the quick-connect electrical junction box design can be as follows.

The quick-connect electrical junction box can be constructed using hard plastic (polymers) consistent with prevailing but pertinent electrical specification and standards including those set by the National Electric Code ("NEC"). Based on space available within the quick-connect electrical junction box and the location of sockets, physical specifications for electrical accessory modules can be defined and made available to manufacturers.

The quick-connect electrical junction box can be manufactured in one-gang, two-gang, three-gang, or greater configurations. The size of the quick-connect electrical junction box, as well as the location of screws for mounting electrical accessory devices and the face plates thereof, can adhere to existing standards and specifications. The overall look and feel of the quick-connect electrical junction box can be similar to electrical boxes in the market today, but will have new features that are not available today such as three female sockets per gang that makes it possible to make electrical connections between the quick-connect electrical junction box and an electrical accessory modules. The quick-connect electrical junction box can also have a terminal block or three wire lugs at the back of the bus carrier module of the quick-connect electrical junction box. Romex can run from the circuit breaker, feed directly into the bus carrier module, and activate the three independent buses with connections made from the live, neutral, and ground wires to the wire lugs.

The wire lugs can be connected, internally to the female sockets located on the front cover of the quick-connect electrical junction box, via live-, neutral-, and ground-dedicated buses. As provided herein, the front cover of the quick-connect electrical junction box with female sockets (openings) can receive the male prongs of the electrical accessory modules. Behind the female sockets are the clamps, formed as part and parcel of the buses. The clamps behind the female sockets on the front cover can be designed to receive and hold an electrical accessory module in place with a strong grip when its male pins/prongs are inserted into the female sockets. The depth and size of the female sockets is designed to provide a maximum physical and electrical contact with the male prongs extending from the electrical accessory module. Thus, the quick-connect electrical junction box can deliver power through three female sockets to receiving male prongs of an electrical accessory module such as a light switch or a power outlet. The top and the bottom of the bus carrier module can include knock-out tabs, that, when knocked out, allow the wires from the main circuit breaker of the house or the commercial building to penetrate through to be connected to the wire lugs or terminal block of the quick-connect electrical junction box. A set of three wire lugs can be provided at the back of the bus carrier module of the quick-connect electrical junction box, each labeled 'L', 'N', or 'G' to ensure correct polarity when connections are being made.

There can be three dedicated buses (e.g., live, neutral, and ground) located on the front of the bus carrier module. The type of metal, gauge, and the width of the buses are designed to comply with the required National Electrical Code ("NEC") standards. The casing design of the quick-connect electrical junction box can include sets of knock out plugs including, for example, one set at the top and another at the bottom of the quick-connect electrical junction box. One or more knock-out tabs can be removed to bring electric wire, such as 12/2 or 14/2 from the main circuit breaker or from another quick-connect electrical junction box connected electrically in parallel. Electric wires coming into the bus carrier module from the top or the bottom can be connected to the live, neutral, and ground wire lugs. Of course, other knock-out plugs can be removed to run one or more electric wires from a first quick-connect electrical junction box to power another quick-connect electrical junction box; thus, the quick-connect electrical junction boxes can be daisy chained, as often required for outlets in a room.

The quick-connect electrical junction box can have one set of wire lugs or terminal blocks regardless of a single- or multiple-gang configuration. Electrical accessory modules can be designed with three flat prongs representing live, neutral, and ground connections that can match the location of the sockets on the front cover of the quick-connect electrical junction box. The quick-connect electrical junction box design can allow the prongs of an electrical accessory module to be plugged into the matching openings in the female sockets of the quick-connect electrical junction box in only one way. Multi-gang quick-connect electrical junction boxes can allow multiple electrical accessory modules to be inserted, and, in general, the quick-connect electrical junction box merely requires a single power connection regardless of a single- or multiple-gang configuration.

For safety reasons, the quick-connect electrical junction box can come with a slip-in or snap-on plastic plate or back cover designed to cover the wires and the terminal blocks or wire lugs. The back cover can be installed after electric wires are connected to the wire lugs or terminal blocks. The quick-connect electrical junction box can then be mounted on a stud (on the right or left) with couple of screws (see FIG. 8).

Electrical outlet plugs and sockets do vary in size, shape, and electrical capacity from country to country, along with variation in standards. Thus, in different countries, the quick-connect electrical junction box can be modified to support standards and specifications observed in those countries.

Manufacture of Quick-Connect Electrical Junction Boxes

Manufacturing methods for the quick-connect electrical junction boxes provided herein can include stamping and bending a sheet of a conductor to form a bus assembly; molding a front cover, a bus module, and a back cover of the quick-connect electrical junction box; and fitting together the front cover, the bus module with the bus assembly, and the back cover to form the quick-connect electrical junction box. Stamping to form the bus assembly can include stamping a nascent bus assembly from the sheet of the conductor, and bending to form the bus assembly can include bending end portions of the nascent bus assembly to form the bus assembly with a number of clamps. Molding the front cover of the quick-connect electrical junction box can include molding a front face of the front cover including a number of sockets configured to accept up to an equal number of prongs of one or more electrical accessory modules. Molding the front cover of the quick-connect electrical junction box can also include molding a back face of the front cover including a number of clamp tunnels corresponding to the number of sockets of the bus assembly. Molding a bus module and a back cover of the quick-connect electrical junction box can include molding a front face and a back face for each of the bus module and the back cover. Molding a bus module of the quick-connect electrical junction box can include molding a front face to receive the buses (live, neutral and ground) and the back face to create opening for the wire lugs. And the back cover can cover the back of the bus carrier module. Subsequent to molding the bus-module back face, a number of wire lugs can be fixed to the bus-module back face, wherein the wire lugs are configured for wiring the quick-connect electrical junction box to a circuit breaker or another quick-connect electrical junction box. Fitting together the front cover, the bus module, and the back cover to form the quick-connect electrical junction box can include correspondingly disposing the number of clamps of the bus assembly in the number clamp tunnels of the front cover, thereby forming the number sockets in the front face. The number of clamp tunnels of the front cover can be configured to restrain the number of clamps from opening too widely and prevent damage to the number of clamps.

With respect to molding the bus module, the molding can further include molding a number of posts and a number of projections configured as bus-isolation barriers in the front face of the bus module. The molding can even further include molding a number of knock-out tabs in the bus module with dimensions such that any one of the knock-out tabs can be removed to accommodate at least incoming or outgoing electrical wiring in its place.

Manufacturing methods for the quick-connect electrical junction boxes provided herein can further include fixing the bus assembly to the bus-module front face. Fixing the bus assembly to the bus-module front face can include inserting a number of molded posts of the bus module through a number of through holes, through slots, or a combination thereof stamped into the bus assembly. Fixing the bus assembly to the bus-module front face can further include melting at least top portions of the number of posts over the number of through holes, the through slots, or the combination thereof and adjacent areas of the bus assembly, thereby fixing the bus assembly to the bus-module front face.

With respect to fixing the number of wire lugs to the bus-module back face, the fixing can include fixing a live-wire lug to a live bus of the bus assembly, a neutral-wire lug to a neutral bus of the bus assembly, and a ground-wire lug to a ground bus of the bus assembly. The live-wire lug can be configured for connecting to a live wire, the neutral-wire lug can be configured for connecting to a neutral wire, and the ground-wire lug can be configured for connecting to a ground wire.

Manufacturing methods for the quick-connect electrical junction boxes provided herein can further include packaging the quick-connect electrical junction box in a package with mounting screws for mounting the quick-connect electrical junction box to a stud.

Installation of Quick-Connect Electrical Junction Boxes

A quick-connect electrical junction box can be installed on a stud on the right or left of the bus module with a couple of screws (e.g., the screws 398) through the predrilled holes (e.g., the screw holes 396). The correct screws to install the quick-connect electrical junction box can be included in the package with the quick-connect electrical junction box to make the installation quicker especially when sheetrock is already in place.

Wiring a new house (new construction) can involve the following 3 steps: 1) Wire the bus carrier module; 2) install the back cover and mount the bus carrier module on a stud; and 3) snap-on the front face on the bus carrier module.

Prior to installing the bus carrier module, 12/14 gauge wiring (depending upon the usage) can be brought from the circuit breaker panel or other power source into the bus carrier module by removing one of the knock-out tabs, stripping the wires, and then physically connecting the live, neutral, and ground wires to the wire lugs labeled 'L,' 'G,' and 'N' (representing live, ground and neutral), respectively. If another quick-connect electrical junction box is required along the wall, the other quick-connect electrical junction box can be mounted and a piece of electric wire cut long enough to reach from the one installed quick-connect electrical junction box to newly mounted quick-connect electrical junction box. One end of the electrical wire can be inserted into the newly mounted quick-connect electrical junction box by removing one of the knock-out tabs and connecting each of the 3 wires to the wire lugs or terminal block's 'L,' 'G,' and 'N' terminals. The other end of the wire can then be inserted into an already powered quick-connect electrical junction box by removing second knock-out tabs and making the connection to the wire lugs, as described above. The back cover can be replaced, the bus carrier can be installed on the stud, and the front cover then can be snapped in place. Multiple quick-connect electrical junction boxes can be strung along in this way, without pig tails or wire nuts.

When remodeling a house, the process of installing quick-connect electrical junction box is the same as described above, but wire runs should already be in place if powering another quick-connect electrical junction box. If that is not the case, then the electrician can remove a small portion of the sheetrock to run wire from one quick-connect electrical junction box to another quick-connect electrical junction box.

Installation of Light Switches

The quick-connect electrical junction box can accommodate "wireless-ready" light switches that support quick-connect electrical junction box plug-in specifications. Once plugged-in, such wireless-ready light switches should be secured with retaining screws at the top and the bottom, similar to traditional light switches.

This eliminates hard wiring from the switch to the light source. Wireless-ready light switches enable communication directly with the lights, once paired. This modular approach can be implemented by running 12 or 14 gauge wire from a circuit breaker to lights in one or multiple rooms as shown in FIG. 10B. Since new homes and remodels often use CFL or LED lights, power consumption typically is very low. Low-wattage and high-luminous lights allow multiple rooms (e.g., ROOMS 1-3 of FIG. 10B) and the lights therein to be connected to a single circuit. Wireless receivers (e.g., receivers R1-4 of FIG. 10B), paired with transmitters, can be added in front of a group of lights that is controlled by the switch (e.g., transmitters T1-T4 of FIG. 10B). Such technology can be incorporated into a switch and power to the Wi-Fi circuit in the switch can be delivered by plugging the switch into the quick-connect electrical junction box. It should be understood that the wireless receivers can also be controlled with other wireless devices such as smart phones, PCs, etc.

Installation of Receptacles

Once all line wire runs are in place such as in FIG. 9B, the quick-connect electrical junction boxes can be installed and receptacles (e.g., dual receptacle outlets) plugged in. The receptacles can be designed as shown in FIG. 9A for the plug-in specifications of the quick-connect electrical junction boxes. Once plugged-in the receptacles should be secured with retaining screws at the top and the bottom like electricians do it now.

Advantages

Wiring a house or a commercial building as provided herein is expected to require only a single inspection by a city inspector. By combining rough and final inspections into one, the home or building owner can save on inspection fees. Since all electrical accessory modules are plug-and-play, there is nothing further that needs to be inspected in a final inspection, once the installation of the quick-connect box has been inspected.

A light switch, an outlet, or the like can become a plug-in module that can be installed anywhere in a multi-gang quick-connect electrical junction box without deciphering which wires to connect among a jumble of wires, which means working with pig tails and wire nuts will be history.

Significant reduction is labor costs can be realized in wiring systems provided herein compared to those done today, which require getting the wires inside a simple junction box, correctly tying the wires with wire nuts, and then connecting the wires to either a switch or a receptacle. On top of all this, electricians constantly have to maneuver and struggle to pack the pig tails along with a switch or a receptacle into the simple junction box. This will deliver savings on electrician's labor.

Wiring a building becomes streamlined without concern for dedicating a specific switch controlling specific set of lights, since no hard wiring is required from the switch to the light source. All the light can be wired directly to the circuit breaker(s). As provided herein, turning a group of lights on or off with a switch can be through wireless communication between a switch (transmitter) and receiver placed in front of the wire connecting a group of lights (see FIG. 10B). This also applies to other load modules, like a ceiling fan.

Further advantages include no polarity issues, as long as the quick-connect electrical junction box is wired correctly in a first instance. Connecting electric wire to the quick-connect electrical junction box is made easy with clear markings of "live," "neutral," and "ground" near the wire lugs along with keeping traditional nickel and brass plating on the screws.

As such, provided herein in some embodiments is a quick-connect junction box designed to eliminate making of pig tails with multiple wires and use of wire nuts in favor of plugging in accessory electrical modules including light switches, receptacles, or other electrical load modules. The quick-connect junction box provides female clamps that allow male pin-based accessory electrical modules to be plugged in. This can be used in a commercial or home installations. There is no change in getting the electrical wires from a circuit breaker into the quick-connect electrical box; the difference is to connect the wires to wire lugs on the back of the quick-connect electric box and not make the pig tails with multiple wires and tie the pig tails with the wire nuts. Once all the wiring is in place, the quick-connect electric box is secured to a stud. At this point an outlet, a wireless enabled switch, or another load module can be plugged in via their male pins into the female sockets in the quick-connect junction box, providing a significant saving on labor.

City inspectors are expected to only do one inspection prior to installing sheet rock. The inspection can be done without the back cover and the front cover. This can allow the inspector to see the wire connections to the bus carrier module. Since the accessories are plug and play, and all wiring is totally encased within the quick-connect electric box, no additional inspection is necessary.

Today a switch is an integral part of wiring a group of lights and significant labor is involved to move that switch or divide that group of lights into 2-3 sub-groups with individual switches. This is being called "hard wiring." With the quick-connect electric box, the hard wiring goes away; the Romex from the circuit breaker box (in a single run) can go from room to room without incorporating a switch (making sure the total amperage of all the light that will be connected is under the what the wire run allows). Wireless switches (transmitters) can be inserted in the quick-connect electric box for power, and a receiver between the Romex coming from the circuit breaker and a group of lights can be turned on or off with the transmitter/switch, once paired. The receiver acts as a relay. The quick-connect electric box provides access to the power and the wireless circuit of the switch/transmitter, when inserted. No hard wiring saves significantly on labor costs and provides flexibility to form a new group of lights. The quick-connect electric box provides the infrastructure and eliminates the hard wiring paradigm.

Although embodiments of this design have been fully described with reference to the accompanying drawings, it is to be noted that various changes and modifications will become apparent to those skilled in the art. Such changes and modifications are to be understood as being included within the scope of embodiments of this design as defined by the appended claims. The invention is to be understood as not limited by the specific embodiments described herein, but only by scope of the appended claims.

Dimensions, materials, and some design changes can occur in accordance with, for example, safety and standards compliance. For example, location and size of the sockets and screw connectors or terminal blocks or wire lugs can change along with the material used to manufacture the quick-connect electrical junction box.

What is claimed is:

1. A quick-connect electrical junction box, comprising:
a front cover including
a front face of the front cover including a number of sockets configured to accept up to an equal number of prongs of one or more electrical accessory modules, and
a back face of the front cover including a number of clamp tunnels corresponding to the number of sockets;
a bus module including
a front face of the bus module including a bus assembly fixed to the bus-module front face,
wherein the bus assembly includes a number of clamps correspondingly disposed in the number clamp tunnels of the front cover forming the number sockets in the front face of the front cover, and
a back face of the bus module including a number of bus assembly-connected wire lugs fixed to the bus-module back face configured for wiring the quick-connect electrical junction box to a circuit breaker or another quick-connect electrical junction box; and
a back cover,
wherein the front cover, the bus module, and the back cover are configured to fit together and form the quick-connect electrical junction box,
wherein the bus-module front face includes a number of posts integral with the bus module,
wherein the bus assembly includes a number of through holes, through slots, or a combination thereof within which the number of posts are disposed in the holes, slots or the combination thereof, and wherein the bus assembly is fixed to the bus-module front face by at least melted top portions of the number of posts melted over the number of the through holes, the through slots, or the combination thereof and adjacent areas of the bus assembly
wherein the bus assembly includes a live bus configured to connect to a live wire through a live-wire lug of the wire lugs, a neutral bus configured to connect to a neutral wire through a neutral-wire lug of the wire lugs, and a ground bus configured to connect to a ground wire through a ground-wire lug of the wire lugs, and wherein the bus-module back face is recessed and the wire lugs are fixed to the recessed bus-module back face.

2. The quick-connect electrical junction box of claim 1, wherein the bus-module front face is recessed, and
wherein the recessed bus-module front face includes a number of projections configured as isolation barriers to isolate the live bus, the neutral bus, and the ground bus from each other.

3. The quick-connect electrical junction box of claim 1, wherein the bus assembly is characteristic of stamping a nascent bus assembly from a sheet of a conductor and bending end portions of the nascent bus assembly to form the number of clamps of the bus assembly, and
wherein the number of clamp tunnels of the front cover are configured to restrain the number of clamps from opening too widely and prevent damage to the number of clamps.

4. The quick-connect electrical junction box of claim 1, wherein the number of sockets are organized into a number of gangs with up to three sockets per gang, and
wherein the up to three socket includes a live socket, a neutral socket, and a ground socket.

5. The quick-connect electrical junction box of claim 1, wherein the front-cover front face is recessed to accommodate one or more electrical accessory modules selected from the group consisting of receptacles, switches, and other load modules.

6. A method, comprising:
stamping a nascent bus assembly for a quick-connect electrical junction box from a sheet of a conductor;
bending end portions of the nascent bus assembly to form a bus assembly with a number of clamps;
molding a front cover of the quick-connect electrical junction box including
a front face of the front cover including a number of sockets configured to accept up to an equal number of prongs of one or more electrical accessory modules, and
a back face of the front cover including a number of clamp tunnels corresponding to the number of sockets of the bus assembly;
molding a bus module of the quick-connect electrical junction box including a front face and a back face of the bus module;
molding a back cover of the quick-connect electrical junction box;
fixing a number of wire lugs to the bus-module back face, wherein the wire lugs are configured for wiring the quick-connect electrical junction box to a circuit breaker or another quick-connect electrical junction box; and fitting together the front cover, the bus module, and the back cover to form the quick-connect electrical junction box, wherein the number of clamps of the bus assembly are correspondingly disposed in the number clamp tunnels of the front cover by fitting together the front cover, the bus module, and the back cover, thereby forming the number sockets in the front face, and wherein the number of clamp tunnels of the front cover are configured to restrain the number of clamps from opening too widely and prevent damage to the number of clamps, wherein the nascent bus assembly includes a live bus configured to connect to a live wire through a live-wire lug of the wire lugs, a neutral bus configured to connect to a neutral wire through a neutral-wire lug of the wire lugs, and a ground bus configured to connect to a ground wire through a ground-wire lug of the wire lugs, wherein the bus-module back face is recessed and the wire lugs are fixed to the recessed bus-module back face, and wherein the nascent bus assembly includes a number of through holes, through slots, or a combination thereof within which a number of posts are disposed in the holes, slots or the combination thereof.

7. The method of claim 6, wherein molding the bus module further includes molding a number of posts and a number of projections configured as bus-isolation barriers in the front face of the bus module.

8. The method of claim 6, wherein molding the bus module further includes molding a number of knock-out tabs in the bus module with dimensions such that any one of the knock-out tabs can be removed to accommodate at least incoming or outgoing electrical wiring in its place.

9. The method of claim 6, further comprising:

fixing the bus assembly to the bus-module front face, wherein fixing the bus assembly to the bus-module front face includes inserting a number of molded posts of the bus module through a number of through holes, through slots, or a combination thereof stamped into the bus assembly, and melting at least top portions of the number of posts over the number of the through holes, the through slots, or the combination thereof and adjacent areas of the bus assembly, thereby fixing the bus assembly to the bus-module front face.

10. The method of claim 6, wherein fixing the number of wire lugs to the bus-module back face includes fixing a live-wire lug to a live bus of the bus assembly configured for connecting to a live wire, fixing a neutral-wire lug to a neutral bus of the bus assembly configured for connecting to a neutral wire, and fixing a ground-wire lug to a ground bus of the bus assembly configured for connecting to a ground wire.

11. The method of claim 6, further comprising:

packaging the quick-connect electrical junction box in a package with mounting screws for mounting the quick-connect electrical junction box to a stud.

\* \* \* \* \*